(12) United States Patent
Rysdyk et al.

(10) Patent No.: US 12,518,640 B2
(45) Date of Patent: Jan. 6, 2026

(54) METHODS AND APPARATUS FOR LINE-OF-SIGHT ENFORCEMENT

(71) Applicant: The Boeing Company, Arlington, VA (US)

(72) Inventors: Rolf Theodoor Rysdyk, Hood River, OR (US); Jasmine Beth Minteer-Levine, Everett, WA (US); Michael John Gobble, Troutdale, OR (US); Scott Patrick Marmillion, White Salmon, WA (US)

(73) Assignee: Insitu, Inc., Bingen, WA (US)

( * ) Notice: Subject to any disclaimer, the term of this patent is extended or adjusted under 35 U.S.C. 154(b) by 174 days.

(21) Appl. No.: 18/457,906

(22) Filed: Aug. 29, 2023

(65) Prior Publication Data

US 2025/0078669 A1 Mar. 6, 2025

(51) Int. Cl.
*G08G 5/34* (2025.01)

(52) U.S. Cl.
CPC ...................... *G08G 5/34* (2025.01)

(58) Field of Classification Search
CPC .................................. G08G 5/34; G08G 5/55
See application file for complete search history.

(56) References Cited

U.S. PATENT DOCUMENTS

2010/0042269 A1* 2/2010 Kokkeby ............. G05D 1/0094
701/3

OTHER PUBLICATIONS

Rolf Rysdyk. "UAV Path Following for Constant Line-of-Sight." In: 2nd AIAA "Unmanned Unlimited" Conf. and Workshop & Exhibit.
(Continued)

*Primary Examiner* — Dylan M Katz
(74) *Attorney, Agent, or Firm* — Hanley, Flight & Zimmerman, LLC

(57) ABSTRACT

Methods and apparatus for line-of-sight (LoS) enforcement are disclosed. A disclosed example apparatus for guidance of an aircraft with respect to a target includes machine readable instructions, and programmable circuitry to at least one of instantiate or execute the machine readable instructions to determine a movement constraint based on an LoS criterion of an LoS corresponding to an orientation of the aircraft with respect to the target, and adjust, based on the movement constraint, movement of the aircraft to relax flight path following to maintain or cause the LoS to be directed away from an occlusion region.

20 Claims, 19 Drawing Sheets

(56) References Cited

OTHER PUBLICATIONS

K. Y. Pettersen and E. Lefeber. "Waypoint tracking control of ships." In: Decision and Control, 2001. Proceedings of the 40th IEEE Conference on. vol. 1. 2001, 940-945 vol. I.

S. Park, J. Deyst, and J. P. How. "A new nonlinear guidance logic for trajectory tracking." In: In Proceedings of the AIAA Guidance, Navigation and Control Conference. 2004, pp. 2004-4900.

R. Rysdyk. "Unmanned Aerial Vehicle Path Following for Target Observation in Wind." In: Journal of Guidance, Control, and Dynamics 29.5 (2006), pp. 1092-1100.

R. Yanushevsky. Modern Missile Guidance. CRC Press, 2007.

D. A. Lawrence, E. W. Frew, and W. J. Pisano. "Lyapunov Vector Fields for Autonomous Unmanned Aircraft Flight Control." In: Journal of Guidance, Control, and Dynamics 31.5 (2008), pp. 1220-1229.

R. Rysdyk. "Course and Heading Changes in Significant Wind." In: Journal of Guidance, Control, and Dynamics 33.4 (2010), pp. 1311-1312.

R. W. Beard and T. W. McLain. Small Unmanned Aircraft: Theory and Practice, pp. 64-65. Princeton University Press, 2012.

J. Gundlach. Designing Unmanned Aircraft Systems. A Comprehensive Approach. 2nd ed. AIAA, 2014. Chap. 2.

\* cited by examiner

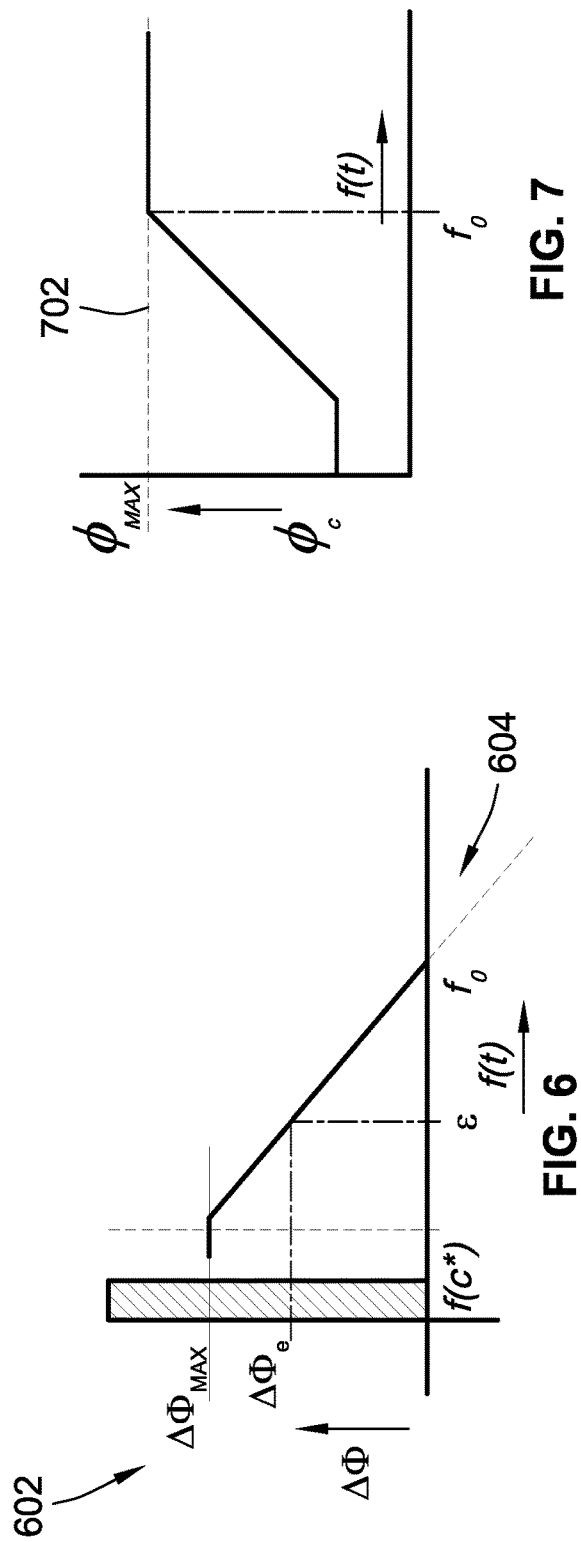
FIG. 6
FIG. 7
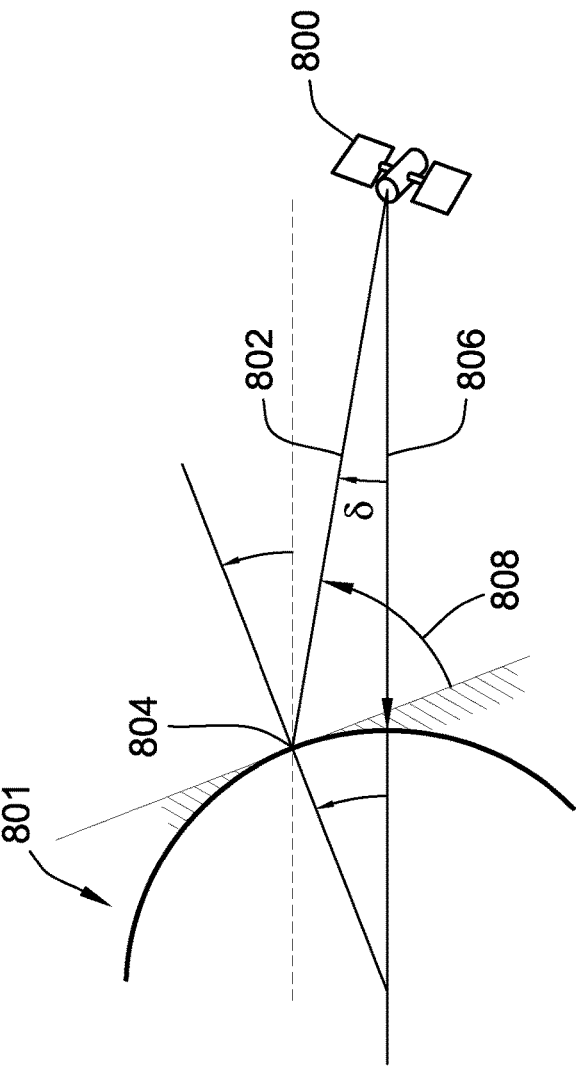
FIG. 8

METHODS AND APPARATUS FOR LINE-OF-SIGHT ENFORCEMENT

FIELD OF THE DISCLOSURE

This disclosure relates generally to aircraft and, more particularly, to methods and apparatus for line-of-sight enforcement.

BACKGROUND

Fixed wing aircraft (and other vehicles) can carry a sensor or other payload, such as a receiver and/or transmitter, having a line-of-sight (LoS) requirement to be maintained and/or enforced for a mission. The mission can pertain to an intelligence, surveillance and reconnaissance (ISR) mission, for example. Typical guidance logic of the fixed wing aircraft regulates airspeed and altitude along a flight path that corresponds to path following directions. However, such a flight path can conflict with the aforementioned LoS requirement. As a result, the ISR mission can be unsuccessful and/or compromised.

SUMMARY

An example apparatus for guidance of an aircraft with respect to a target includes machine readable instructions, and programmable circuitry to at least one of instantiate or execute the machine readable instructions to determine a movement constraint based on an LoS criterion of an LoS corresponding to an orientation of the aircraft with respect to the target, and adjust, based on the movement constraint, movement of the aircraft to relax flight path following to maintain or cause the LoS to be directed away from an occlusion region.

An example non-transitory machine readable storage medium includes instructions to cause programmable circuitry to at least determine an orientation of an aircraft, determine an LoS with respect to the target based on the orientation, determine a movement constraint of the aircraft based on an LoS criterion, and adjust, based on the movement constraint, movement of the aircraft to relax flight path following to maintain or cause the LoS to be directed away from an occlusion.

An example method includes determining, by executing instructions with programmable circuitry, an orientation of an aircraft, determining, by executing instructions with the programmable circuitry, a movement constraint of the aircraft based on an LoS criterion of an LoS corresponding to the orientation of the aircraft with respect to a target, and adjusting, by executing instructions with the programmable circuitry, movement of the aircraft based on the movement constraint to relax flight path following to maintain or cause the LoS to remain away from an occlusion region.

BRIEF DESCRIPTION OF THE DRAWINGS

FIG. 6 is a graph depicting an example control scheme that can be implemented in examples disclosed herein.

FIG. 7 is an example graph depicting an example effect on bank angle control limiting.

FIG. 8 depicts example satellite geometry analyzed in conjunction with examples disclosed.

Figure 1A:
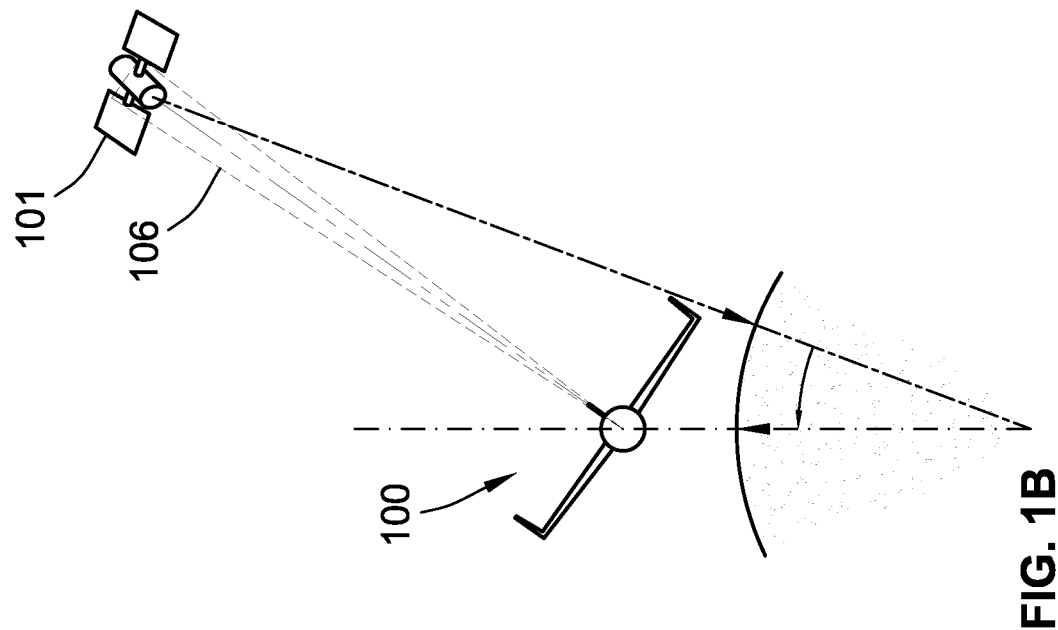
FIGS. 1A-1C depict an example environment and/or application in which an example guidance system in accordance with teachings of this disclosure operates to guide a vehicle for line-of-sight (LoS) enforcement.

In general, the same reference numbers will be used throughout the drawing(s) and accompanying written description to refer to the same or like parts. The figures are not necessarily to scale. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein, integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

DETAILED DESCRIPTION

Methods and apparatus for line-of-sight (LoS) enforcement are disclosed. Some vehicles, such as aircraft or satellites, can necessitate an LoS enforcement to a target (e.g., maintaining an LoS to a target satellite with a requisite degree). For example, a device carried by an aerial vehicle (AV) can necessitate a degree of alignment relative to a target based on a functional vector or directional requirement. In particular, the device can correspond to an LoS enforcement and/or requirements for proper operation thereof. However, typical guidance systems can determine, plot and/or generate a flight path that can cause a vehicle to violate the LoS enforcement and/or requirements. For example, the flight path is typically determined and/or generated based on a minimum distance of travel (e.g., a shortest path) or a shortest calculated travel time between the AV and a destination.

Examples disclosed herein enable effective guidance of a vehicle while enabling enforcement of an LoS requirement of the vehicle with respect to a target (e.g., an LoS requirement corresponding to an orientation toward the target, an LoS requirement corresponding to an orientation facing away from the target, etc.). The LoS requirement may be based on a sight line, avoidance requirements (e.g., reducing a detectability of the vehicle) and/or directional requirements (e.g., vector requirements) of a device carried by the vehicle. Examples disclosed herein can limit and/or control orientation and/or movement of the vehicle to maintain enforcement of the LoS requirement. For example, movement along a direction and/or axis can be constrained based on the LoS requirement. Additionally or alternatively, a flight path can be determined and/or generated so that the vehicle can maintain the LoS requirement. According to some examples disclosed herein, the aforementioned flight path can include a sequence of movements of the vehicle (e.g., a bank angle/turning sequence of a fixed wing aircraft, a bank angle sequence with respect to a commanded flight path, etc.). Additionally or alternatively, examples disclosed herein can control the vehicle to maintain compliance with the LoS requirement (e.g., control the vehicle to maintain compliance of the LoS requirement in substantially real-time).

Some examples disclosed herein determine an orientation or predicted orientation of an aircraft based on sensor information. In turn, an LoS (e.g., a predicted LoS, an LoS cone, etc.) of the aircraft with respect to a target is determined and a flight path following can be relaxed (e.g., a normal flight path is adjusted) to determine a commanded flight path of the aircraft to maintain or shift/move the LoS within an acceptable LoS range as the aircraft moves along the commanded flight path. The LoS range may vary at different positions of the aircraft. According to some examples disclosed herein, a commanded or predetermined flight path is modified and/or adjusted to maintain the LoS within the aforementioned acceptable LoS range. To that end, the commanded flight path can be lengthened (e.g., an increased path distance) and/or the flight path can be made to be more irregular in shape (e.g., the flight path is defined by a combination of segments and/or splines as opposed to a relatively straight and/or smoothly curved path).

In some examples, generation of the commanded flight path includes relaxing flight path following to a controlled degree to maintain the LoS of the aircraft to comply with LoS requirements and/or enforcement. In some examples, a previous flight path is adjusted to define the commanded flight path. The commanded flight path may have a longer path length than the previous flight path. Some examples disclosed herein are utilized in conjunction with fixed wing aircraft and/or an AV, which may be manned or unmanned. In some examples, the commanded flight path may include bank-by-bank instructions to direct movement of an AV while maintaining the LoS within an acceptable LoS range. Additionally or alternatively, the commanded flight path can include a function (e.g., a parametric function) that directs movement of the AV with respect to a flight parameter, such as, but not limited to, time, heading, altitude, etc. to ensure that LoS of the aircraft remains away from an LoS obstruction range as the AV moves along the commanded flight path. In some examples, a rate of movement is varied and/or controlled based on the LoS obstruction range and/or proximity to an LoS obstruction.

Figure 1B:
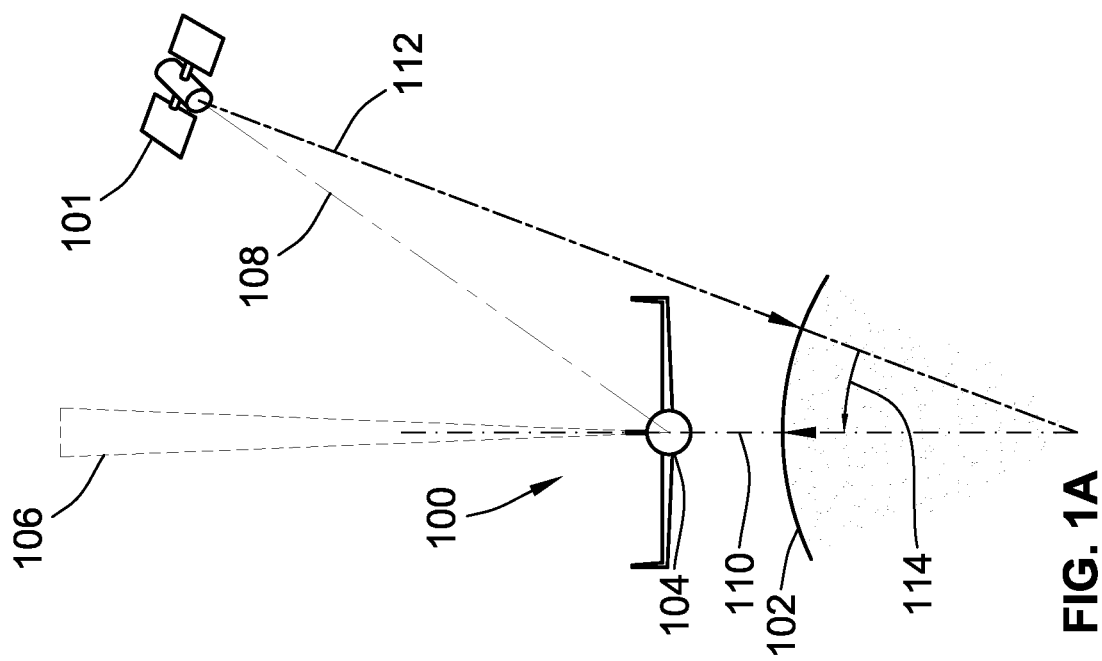
Figure 1C:
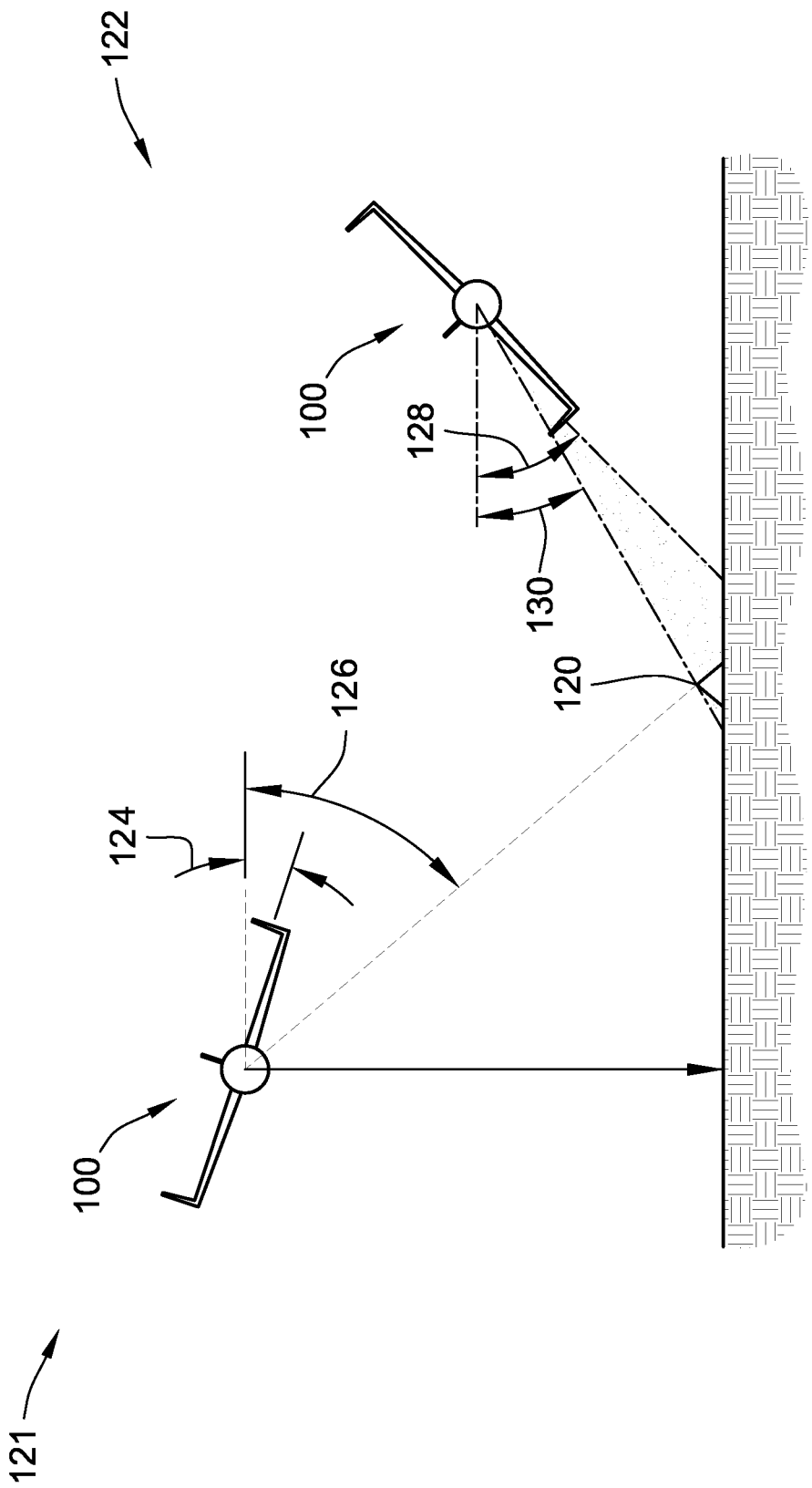

FIGS. 1A-1C depict an example environment and/or application in which an example guidance system in accordance with teachings of this disclosure operates to guide a vehicle for LoS enforcement and/or LoS-based guidance. Turning to FIG. 1A, an aircraft 100, which is implemented as an AV in this example, is shown with respect to a target 101. In this example, the target 101 is implemented as a satellite. However, the target 101 may be any other appropriate stationary or moving object. In the illustrated example of FIG. 1A, the target 101 orbits a planet 102.

The example aircraft 100 includes a guidance system 104 with an associated LoS cone 106 that is to be directed away from the target 101 for proper operation of a device (e.g., a sensor, a transceiver, etc.) carried by the aircraft 100. In particular, the LoS cone 106 corresponds to a functional vector associated with the aircraft 100 such that the aircraft 100 is to be oriented relative to the target 101 with the LoS cone 106 oriented/directed away from the target 101 to a requisite degree (e.g., within an angular range that is sufficiently oriented away from the target 101), thereby defining an LoS offset and/or deviation. In other examples, the LoS cone 106 is to be oriented and/or aimed toward the target 101 to a requisite degree for LoS enforcement. Further, a line 108 represents a vector between the target 101 and the aircraft 100.

In the illustrated example of FIG. 1A, a line 110 represents a vector from a center of the planet 102 to the aircraft 100 while a line 112 represents a vector from the target 101 to an equator of the planet 102. Accordingly, the line 110 and the line 112 are angled relative to one another, as generally represented by an arrow 114.

FIG. 1B depicts the aircraft 100 with an LOS relative to the target 101 blocked. In particular, the aforementioned LoS cone 106 intersects and/or aligns with the target 101 to a requisite degree. As a result, the LoS cone 106 is not within an acceptable and/or required LoS range. In this example, a device carried by the aircraft 100 cannot properly operate with the LoS cone 106 generally facing toward the target 101 to a requisite degree. As can be seen in FIG. 1B, the aircraft 100 is banked with the LoS cone 106 intersecting the target 101.

Turning to FIG. 1C, the aircraft 100 is shown with respect to a target 120, which is ground-based and stationary in this example. In the illustrated view of FIG. 1C, a first scenario 121 is shown on the left side of FIG. 1C and a second scenario 122 is shown on the right side of FIG. 1C. In the first scenario 121, the aircraft 100 is shown at a bank angle 124. Further, an occlusion bank angle 126 is shown such that the aircraft 100 and/or a device of the aircraft 100 is not occluded from the target 120. In contrast, in the second scenario 122, the aircraft 100 is occluded from the target 120. In particular, as can be seen in the illustrated view of FIG. 1C, a bank angle 128 causes an angular degree of occlusion represented by an angle 130.

With respect to FIGS. 1A-1C. examples disclosed herein can direct movement of an aircraft (or other maneuverable object/vehicle) to control and/or enforce an alignment/offset of an LOS and/or LoS deviation from the aircraft to a corresponding target. To that end, examples disclosed herein can limit an angular range of movement of the aircraft (e.g., limit a bank angle range of the aircraft) to maintain an LoS alignment from the aircraft to the target. The LoS alignment can be a degree of alignment and/or misalignment therebetween. In other words, examples disclosed herein can enforce an LoS to be directed toward or away from the target to a requisite degree and/or range.

While the example applications of FIGS. 1A-1C are shown in the context of a fixed wing aircraft, examples disclosed herein can be applied to any appropriate application with a vehicle (or other maneuverable object) with respect to controlling an LoS, which may be defined by a functional vector of the vehicle (e.g., an alignment vector of a mounted camera, an alignment vector of a transceiver, an alignment vector of a sensor, etc.).

Figure 2:
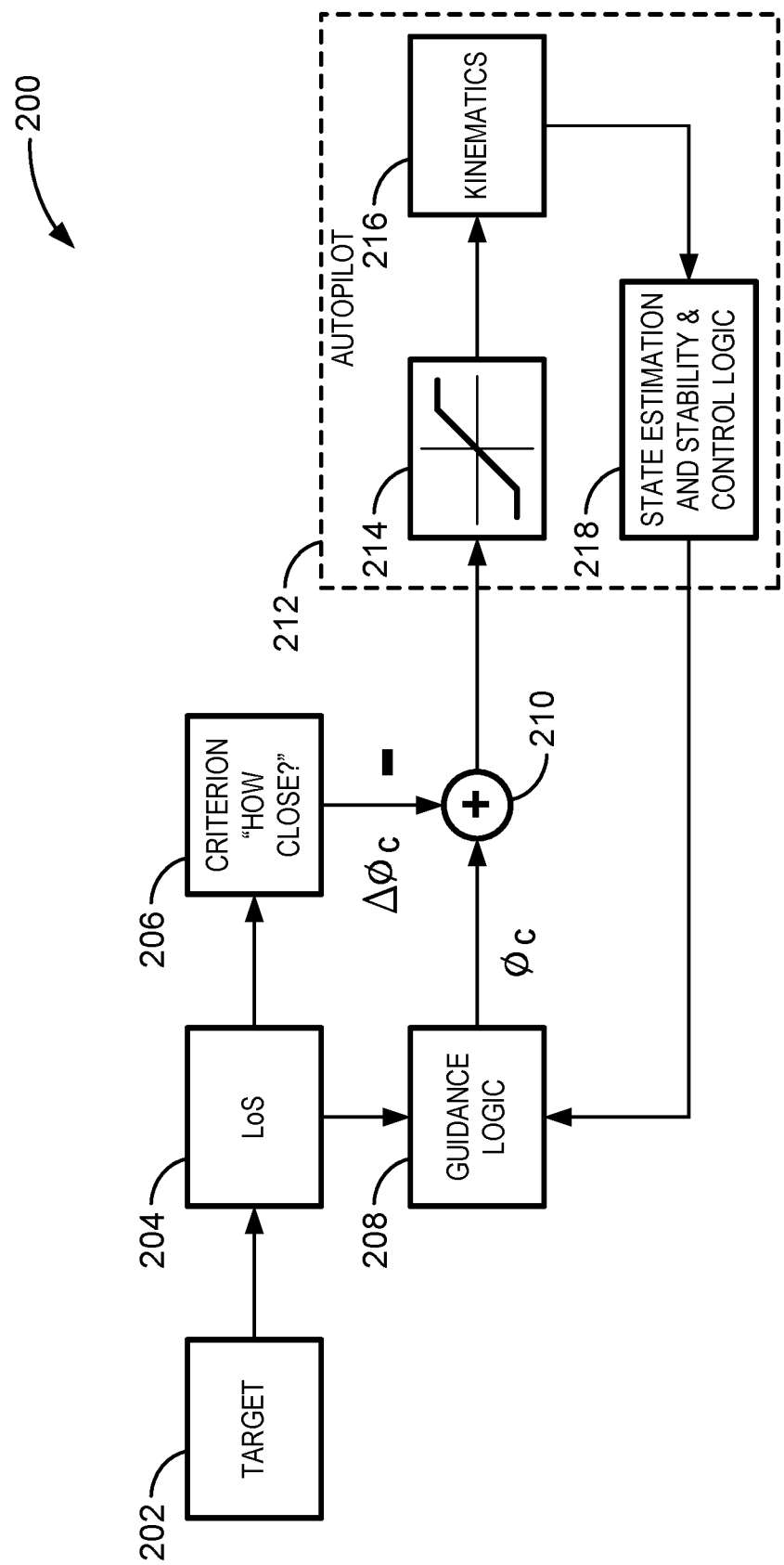
FIG. 2 is a schematic overview of an example process flow in accordance with teachings of this disclosure.

FIG. 2 is a schematic overview of an example process flow 200 in accordance with teachings of this disclosure. In the illustrated example of FIG. 2, a block 202 corresponds to a target (e.g., the target 101, the target 120). In particular, the example block 202 corresponds to a relative position and/or orientation of the target relative to an aircraft (e.g., the aircraft 100). In turn, a block 204 corresponds to determining a degree of alignment between an LoS of the aircraft and/or an LoS directional alignment/offset from the aircraft to the target. According to examples disclosed herein, a criterion 206 corresponds to a degree of alignment/closeness between the LOS and its corresponding cone of obstruction or interruption to the target. The example criterion 206 can correspond to an alteration or adjustment of a commanded bank angle determined by guidance logic 208 for enforcement of LoS requirements. Additionally or alternatively, bank-to-turn logic is implemented to enforce the LoS requirements.

According to examples disclosed herein, a difference between and/or sum of the guidance logic 208 and the degree of alignment corresponding to the criterion 206 is calculated at a summation 210 for the automated guidance system (e.g., an autopilot system) 212 as a command input thereto. In this example, the automated guidance system 212 utilizes a command range 214 in conjunction with kinematics 216, as well as logic 218 corresponding to state estimation, stability and control. In turn, the example automated guidance system 212 provides information and/or updates to the guidance logic 208, thereby defining a control loop. As can be seen in the illustrated example of FIG. 2, the example process flow 200 takes into account LoS with respect to a target in the context of automated flight control.

Figure 3:
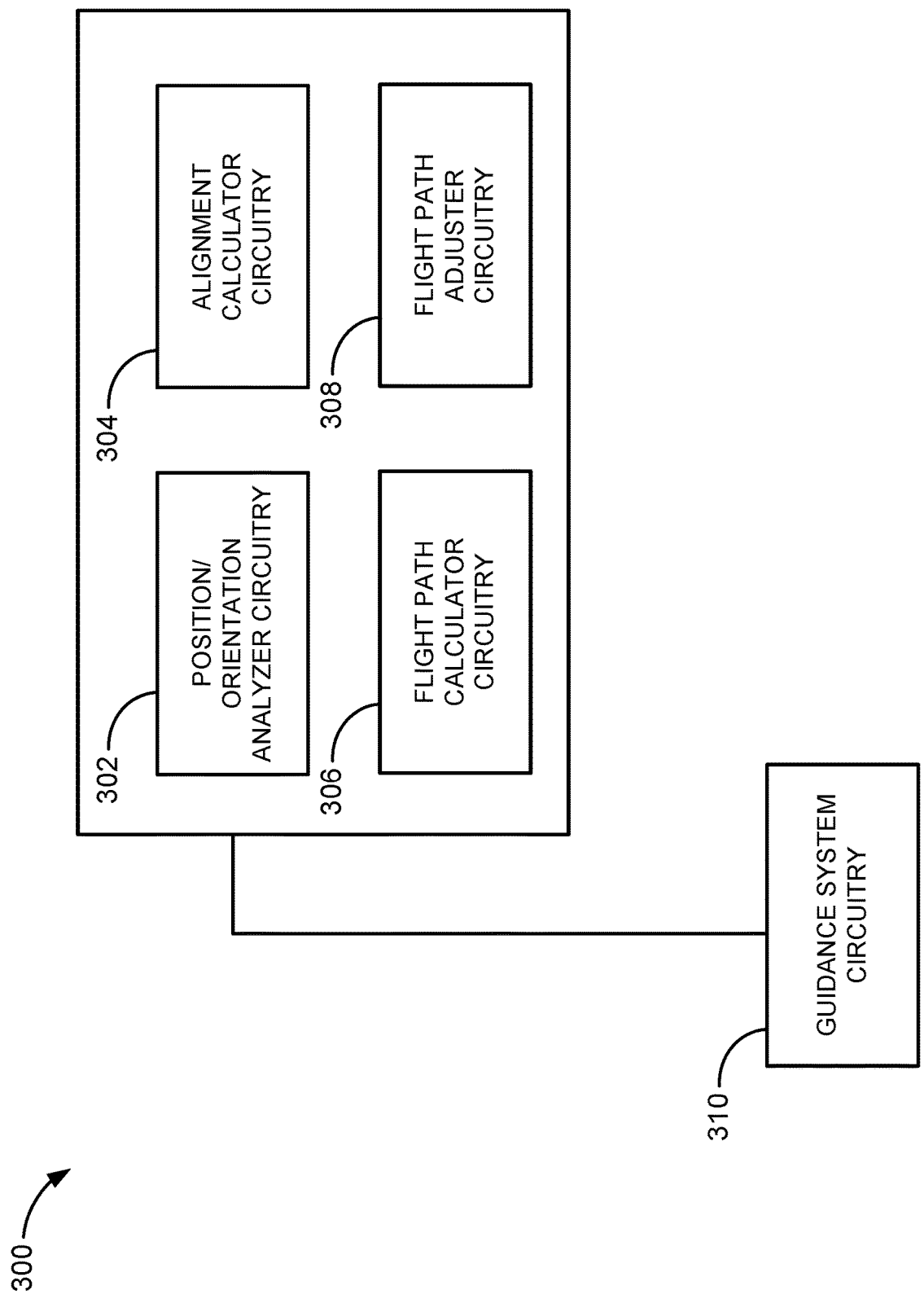
FIG. 3 is a block diagram of an example vehicle guidance system that can be implemented in examples disclosed herein.

FIG. 3 is a block diagram of an example vehicle guidance system 300 that can be implemented in the aircraft 100 of FIG. 1 to guide the aircraft 100 while enforcing LoS criteria. In other examples, the vehicle guidance system 300 can be implemented in a system external to the aircraft 100 (e.g., a control system directs movement of the aircraft 100 via a network and/or communication system). The example vehicle guidance system 300 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the vehicle guidance system 300 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

The example vehicle guidance system 300 includes position/orientation analyzer circuitry 302, example alignment calculator circuitry 304, example flight path calculator circuitry 306, and example flight path adjuster circuitry 308. According to examples disclosed herein, the example vehicle guidance system 300 can include and/or be communicatively coupled with guidance circuitry 310.

The position/orientation analyzer circuitry 302 of the illustrated example determines a position and/or orientation of the aircraft 100 with respect to a target (e.g., a satellite, a stationary structure, another vehicle, a detector, etc.). In this example, the position/orientation analyzer circuitry 302 utilizes sensor data measured at the aircraft 100. In some examples, the position/orientation analyzer circuitry 302 analyzes and/or takes into account factors affecting flight of the aircraft 100, such as wind, external air conditions, etc. In some examples, the position/orientation analyzer circuitry 302 is instantiated by programmable circuitry executing position/orientation analyzer instructions and/or configured to perform operations such as those represented by the flowchart of FIG. 4.

In this example, the alignment calculator circuitry 304 determines and/or calculates an LoS alignment, offset and/or deviation (e.g. a degree of closeness in terms of LoS) from the aircraft 100 to the target. In particular, the alignment calculator circuitry 304 can determine a degree of alignment/misalignment between the LoS from the aircraft 100 (e.g., an instrument-based LoS, a sensor based LoS, etc.) to the target (e.g., determination of a presence of a gimbal lock). According to examples disclosed herein, the alignment calculator circuitry 304 can determine whether LoS requirements (e.g., an LOS range, an LOS threshold, a degree of LoS closeness, etc.) are being met and/or enforced. According to examples disclosed herein, the alignment calculator circuitry 304 determines a degree to which the LoS aligns with respect to the aforementioned target. Enforcement of the LoS requirements may pertain to aligning the LoS to the target to a requisite degree or offsetting an alignment of the LoS from the target. In other words, enforcement of the LoS requirements can be based on comparing an LoS to an LoS range and/or offset (e.g., a target alignment offset). In some examples, the alignment calculator circuitry 304 is instantiated by programmable circuitry executing alignment calculator instructions and/or configured to perform operations such as those represented by the flowchart of FIG. 4.

The example flight path calculator circuitry 306 determines and/or adjusts a commanded flight path of the aircraft 100. In this example, flight path calculator circuitry 306 determines the commanded flight path such that the LoS requirements are enforced (or an orientation of the aircraft 100 is adjusted to meet the LoS requirements) as the aircraft 100 traverses the commanded flight path. As a result, the LoS can be enforced while the aircraft 100 moves along the commanded flight path. To enforce the LoS requirements, a distance and/or path length of the commanded flight path may be increased. For example, in contrast to a commanded flight path that is straight and/or relatively smooth (e.g., a relatively smooth curve), the commanded flight path can be generated and/or defined to consist of multiple segments (e.g., curved segments and/or splines) that enable the aircraft 100 to arrive at a destination and/or waypoint without violating the LoS requirements. In some examples, the flight path calculator circuitry 306 is instantiated by programmable circuitry executing flight path calculator instructions and/or configured to perform operations such as those represented by the flowchart of FIG. 4.

According to some examples disclosed herein, the flight path adjuster circuitry 308 can be implemented to adjust LoS movement of the aircraft 100 and/or alter a commanded flight path based on LOS enforcement. For example, the flight path adjuster circuitry 308 can adjust a previously defined commanded flight path to ensure enforcement and/or compliance with the LoS requirements. According to some examples disclosed herein, the flight path adjuster circuitry 308 can adjust the commanded flight path based on limitations of a bank angle of the aircraft 100. In some examples, the flight path adjuster circuitry 308 is instantiated by programmable circuitry executing flight path adjuster instructions and/or configured to perform operations such as those represented by the flowchart of FIG. 4.

The guidance circuitry 310 of the illustrated example can be implemented to guide the aircraft 100 based on the commanded flight path. To that end, the example guidance circuitry 310 can direct movement of the aircraft 100 based on the commanded flight path while enforcing LoS requirements in view of kinematics and other flight variables/parameters. In some examples, the guidance circuitry 310 is instantiated by programmable circuitry executing guidance instructions and/or configured to perform operations such as those represented by the flowchart of FIG. 4.

Examples disclosed below encompass example calculations that can be implemented in examples disclosed herein. For fixed wing AVs and/or unmanned aerial vehicles (UAVs), airspeed, $V_a$, is typically controlled in a relatively precise manner and, hence, $V_a$ can be assumed to be relatively constant. AVs are equivalently controlled with a bank angle or a turn rate. The following nomenclature are utilized:

g gravitational constant
$k_y$ cross-track error gain
ISR intelligence, surveillance, and reconnaissance
$K_c$ course tracking gain
LOS Line-of-sight vector
m sigmoidal gain
S independent positioning parameter along path
$R_s$ radius of path or orbit
$R_e$ approximate radius of earth
$V_g$ inertial speed, "ground speed"
$V_a$ speed relative to airmass, "airspeed"
x position coordinate along x-axis
y position coordinate along y-axis
$y_s$ cross-track error
$z_b$ body-fixed z-axis (+ve down)
φ bank angle
χ air vehicle inertial course
$\chi_c$ command inertial course
χH convergent course intercept behavior
$\chi_{icpt}$ desired path intercept angel
$\chi_s$ path direction at point s
ψ air vehicle heading
Subscript Interpretation:
a relative to airmass
b body-fixed axes
C command signal
g relative to ground plane (inertial)
icpt intercept
ned relative to the inertial frame, (North, East, Down)
S relative to desired path
x in direction of x-axis
y in direction of y-axis Accordingly, an approximation of kinematics is shown in example equations below:

$$\dot{p}N = V_g \cos \chi \qquad (1)$$

$$\dot{p}E = V_g \sin \chi \qquad (2)$$

$$\dot{V}_g = \dot{\psi} V_a \sin(\chi - \psi) \qquad (3)$$

$$\dot{\chi} = \dot{\psi} \frac{V_a}{V_g} \cos(\chi - \psi) \qquad (4)$$

$$\dot{\psi} = \frac{g}{V_a} \tan \phi_c \qquad (5)$$

According to examples disclosed herein, formulation of steps in the path-following problem is as follows: 1) controlling a vehicle (e.g., an AV, a UAV, a satellite, a controlled projectile, a water vessel, a submersible, etc.) to be on track, or equivalently obtaining a crosstrack error that is approximately zero, 2) Obtaining alignment such that the course of the vehicle can match a desired path, and 3) matching the path curvature, which can imply sufficient control force to change direction along the path. In a typical strategy employed when the vehicle is relatively far off the track, item 1) above is prioritized, and combined with items 2) and 3) as the vehicle approaches the desired path. According to examples disclosed herein, path following guidance laws can take the form of:

$$\chi_c = \chi_s + \chi H, \qquad (6)$$

where $\chi_c$ is the commanded course for the vehicle, $\chi_s$ is the local direction of the desired path, and χH represents a desired and/or targeted converging behavior. In this example, the converging behavior guides the vehicle onto or toward the track while aligning the vehicle course with the desired path direction in a relatively simultaneous manner, thereby achieving the aforementioned items 1) and 2). In maritime navigation applications, this can be loosely referred to as good helmsman behavior. χH can take a variety of well-established forms, for example, derived from proportional navigation logic or a vector potential field.

In aviation applications, guidance logic is typically enacted by a normal force via the bank-to-turn logic of the vehicle. Accordingly, the bank-to-turn logic used to maneuver the vehicle is relative to the airmass and may be kinematically expressed as:

$$a_b \triangleq V_a \dot{\psi}_c = g \tan \phi_c,$$

where $a_b$ is the vehicle acceleration, $V_a$ is the vehicle airspeed, $\dot{\psi}_c$ is the commanded turn-rate, and $\phi_c$ is the commanded bank angle. This expression corresponds to a control force that is perpendicular to the aircraft body x-axis, and consequentially steers the vehicle relative to the airmass. An option to construct the nominal bank angle command, $\phi_c$, in FIG. 2 is to specify a desired aircraft heading behavior utilizing example Equation 5 as follows:

$$\phi_c = \arctan\left[\frac{V_a}{g}\{\dot{\psi}_c + K_\psi(\psi_c - \psi)\}\right], \qquad (7)$$

where $V_a$ is the speed relative to the airmass, ψ is an aircraft heading, and $K_\psi$ is a tunable design parameter. Path following logic can be defined relative to an inertial reference. The kinematics presented above may provide a connection between air-relative control effects and necessitated acceleration normal to the inertial path:

$$a_c = g \cos(\chi - \psi) \tan \phi_c \qquad (8)$$

The angle (χ−ψ) is based on wind affecting the path of the aircraft and is often referred to as a crab-angle. For example, if this crab angle is known or estimated, then the commanded bank angle can be constructed based on example Equation 4 as:

$$\phi_c = \arctan\left[\frac{V_g}{g \cos(\chi - \psi)}\{\dot{\chi}_c + K_c(\chi_c - \chi)\}\right], \qquad (9)$$

where Vg is the speed relative to the ground, and $K_c$ is a tunable design parameter. For many aircraft, the nominal airspeed is significantly greater than typical wind-speeds encountered in flight. In such cases, the control law of example Equation 9 can be approximated with example Equation 10 below:

$$\phi_c = \arctan\left[\frac{V_g}{g}\{\dot{\chi}_c + K_c(\chi_c - \chi)\}\right] \quad (10)$$

Examples disclosed herein correspond to calculation of an alignment criterion. Two frames-of-reference include a body-fixed frame and a local North-East-Down frame. The body-fixed frame $F_b$ with axes: $\hat{x}_b$ from center-of-gravity (CG) through the nose of the vehicle, $\hat{y}_b$ out the right wingtip, and $\hat{z}_b$ 'down' through the vehicle floor (to complete a right-handed frame). In this example, the unit-vector $\hat{z}_b$, expressed in $F_b$ is:

$$\hat{z}_b = \begin{pmatrix} 0 \\ 0 \\ 1 \end{pmatrix}_b$$

As mentioned above, examples disclosed herein can utilize a second frame of reference, which is a local North-East-Down frame Fned. In this example, an LOS is defined from the gimballed antenna or payload to a receiver, transmitter, or object of interest. For example, an LoS between an aircraft and a satellite can be expressed as:

$$\vec{l} = \vec{p}_{sat} - \vec{p}_{AV}$$

According to examples disclosed herein, given the scenario of gimbal lock described previously, a gimbal lock may be defined as occurring when the LoS is aligned with $\hat{z}_b$. The degree to which the LoS and aircraft body-z axis are aligned can be analytically expressed as their scalar vector product (or inner product):

$$c(t) \triangleq |\hat{z}_b^T \hat{l}|, \quad (11)$$

where the $\hat{}$ notation implies a normalized unit vector:

$$\hat{l} = \frac{\vec{l}}{\|\vec{l}\|}$$

Thus, the criterion in Equation 11 provides the cosine of the angle between aircraft $\hat{z}_b$-axis and LoS. In this example, c(t) of example Equation 11 is not an explicit function of time but, rather, a function of aircraft orientation, as will be shown below. However, a reference to time is utilized here to imply dynamic behaviors, for example. Utilizing example Equation 11, the gimbal lock scenario can now be analytically expressed as:

$$\text{Gimbal-lock: } c^* \triangleq \{|\hat{z}_b^T \hat{l}| = 1\} \quad (12)$$

Further, a gimbal lock-caution state can be defined as the LoS aligning to within five degrees, for example. This gimbal-lock-caution state can be defined by example Equation 13:

$$\text{Caution: } c(t) \geq c^* - \varepsilon, \quad (13)$$

where $0 < \varepsilon < 1$.
In some examples, a goal is to provide guidance such that the vehicle maneuvers while maintaining:

$$c(t) < 1 - \varepsilon \quad (14)$$

According to examples disclosed herein, the aircraft body-z-axis in the local North-East-Down frame can be expressed as follows:

$$\hat{z}_b = \begin{pmatrix} \sin(\phi)\sin(\psi) + \cos(\phi)\cos(\psi)\sin(\theta) \\ \cos(\phi)\sin(\psi)\sin(\theta) - \cos(\psi)\sin(\phi) \\ \cos(\phi)\cos(\theta) \end{pmatrix}_{ned} \quad (15)$$

The normalized LoS can also be expressed in the same frame as example Equation 16:

$$\hat{l} \triangleq \begin{pmatrix} \delta_N \\ \delta_E \\ \delta_D \end{pmatrix}_{ned}, \quad (16)$$

where the normalized North-component is obtained as:

$$\delta_N = \frac{N_{sat} - N_{AV}}{\|\vec{p}_{sat} - \vec{p}_{AV}\|}$$

and, similarly, for the East- and Down-components. In this example, by substituting Equations 15 and 16 into Equation 11, an expression for c(t) in terms of satellite position and aircraft position and commanded orientation is formed as example Equation 17:

$$c(t) = |\{\sin(\phi_c)\sin(\psi) + \cos(\phi_c)\cos(\psi)\sin(\theta)\}\delta_N + \quad (17)$$
$$\{\cos(\phi_c)\sin(\psi)\sin(\theta) - \cos(\psi)\sin(\phi_c)\}\delta_E + \{\cos(\phi_c)\cos(\theta)\}\delta_D|$$

According to examples disclosed herein, utilization of a local North-East-Down frame can be convenient and is also known as a flat earth approximation. It can, for example, be assumed as fixed at the ground control station (GCS). In some examples, the flat earth approximation is convenient for formulation and analyses. However, the example methodology described herein is not restricted to this approximation and can be applied in any coordinate formulation. Equation 17 indicates how the criterion c(t) is in fact a function of aircraft orientation and relative position of the satellite:

$$c(t) = c(\phi_c(t), \theta(t), \psi(t), \delta_N(t), \delta_E(t), \delta_D(t))$$

According to examples disclosed herein, sensitivity of a criterion with respect to aircraft orientation can be checked. To that end, given that pitch angles generally remain relatively small, it can be assumed that cos(θ) is approximately equal to 1 and sin (θ) is approximately equal to θ. As a result, the third term in c(t) reduces to cos $\phi\delta_D$. For operations closer to the equator, a geostationary satellite leads to D being substantially larger than the North and East components, implying a relatively large effect from bank angle alone, with relatively minor effects from pitch and heading. Further, example Equation 17 reveals that, to first order ($\theta\delta_N$ and $\theta\delta_E$ neglected), the following sensitivities to aircraft orientation are present:

$$\frac{\partial c}{\partial \phi} \approx \cos\phi(\delta_N \sin\psi - \delta_E \cos\psi) - \delta_D \sin\phi \tag{18}$$

$$\frac{\partial c}{\partial \theta} \approx \cos\phi(\delta_N \cos\psi + \delta_E \sin\psi) \tag{19}$$

$$\frac{\partial c}{\partial \psi} \approx \sin\phi(\delta_N \cos\psi + \delta_E \sin\psi) \tag{20}$$

As can be seen above, there is a relatively strong effect of tilt {φ,θ} and, in particular, with heading w playing a role once the air vehicle is banked. This corresponds to expectations and can justify utilizing manipulation of bank angle command to avoid relatively high alignment.

Examples disclosed herein can be utilized for bank angle limiting. In some examples, a sensitivity to φ can be utilized and the bank angle can be utilized as a primary means and/or methodology to reduce LOS alignment. An angular expression from the alignment criterion can be obtained as the following:

$$f(t) = \arccos(c(t))$$

Thus, in this example, f(t) represents the angle between the LoS and the $z_b$-axis. Some examples disclosed herein utilize the alignment angle as feedback to limit the bank angle as below. According to examples disclosed herein, a bank angle-limit adjustment can be expressed as the following:

$$\Delta\Phi = \frac{(f_0 - f(t))}{(f_0 - \varepsilon)}\Delta\Phi_\varepsilon \tag{21}$$

In this example, the bank angle adjustment is a linear function of the alignment criterion, and parameterized as shown in FIG. 6, where ε represents an angle that defines a conservative cone around the gimbal lock orientation. For example, if a gimbal lock occurs at two degrees from zenith, a cone can be defined by specifying ε=5° to account for turbulence and transients without achieving a gimbal lock. Given a nominal bank angle limit of the fixed wing aircraft, for example, Φ=30°, the aircraft can be limited to maneuvering with:

$$-\Phi \le \phi_c \le +\Phi$$

According to examples disclosed herein, the proposed feedback is as follows:

$$-(\Phi - \Delta\Phi) \le \phi_c \le +(\Phi - \Delta\Phi),$$

where the restriction of the bank angle with ΔΦ can ensure that a relatively clear LoS to the satellite is maintained, thereby potentially necessitating constraints on the path following ability. This effect can be represented in FIG. 7.

Examples disclosed herein can account for bounded effects of bank angle limitation. The Good Helmsman formulation, Equation 6, does not contain integrators, and has an inherent robustness to smooth perturbations from the nominal. When the Good Helmsman is applied in conditions that do not inhibit nominal flight operations, then the perturbation from gimbal lock avoidance can be handled with a relatively mild effect on orbiting scenarios, as demonstrated. Further, given the kinematics formulation of example Equations 1-5, the effects of the design and its parameters can be fully assessed prior to flight, utilized in prediction or evaluation of mission scenarios, and/or utilized in post-flight analyses. Significantly, this does not depend on the particular type of aircraft and only on desired airspeed, anticipated altitude, and predicted wind conditions, etc.

According to examples disclosed herein, a gimbal lock can be reduced and/or avoided. As an example scenario, consider an aircraft operating at a latitude of twenty-two degrees and maintaining an LoS with a geostationary satellite over the equator, directly South of the aircraft, as see in FIG. 8, a satellite 800 will be located at an 'elevation-angle' above the horizon, determined by latitude of the operations. For example, in the context of FIG. 8, this relationship can be demonstrated as follows:

Elevation angle = 90° − (latitude + δ)

In a relatively straight and level flight, the angle between the aircraft $z_b$ axis and the line-of-sight equals latitude+δ. When the aircraft maneuvers, its Z-axis changes orientation and this angle will change. The criterion in example Equation 17 demonstrates that this angle can be relatively small and approaches zero. When the angle approaches zero (complete alignment) then the f-criterion approaches a value of approximately 1. This aspect is shown in FIG. 12B below. The feedback signal in Equation 1) adjusts the aircraft bank angle when the aircraft orientation is relatively close to total alignment between the $z_b$-axis and LoS, as shown in the illustrated view of FIG. 12C. The consequence of the limited bank is that the path following and/or accuracy is relaxed in accordance with the limited bank angle, until the satellite line-of-sight is no longer compromised by the bank angle:

$$\tan(\phi^*) = \frac{h_o}{R_o}$$

According to examples disclosed herein related to the aforementioned example wing occlusion scenario shown in FIG. 1B, the critical bank angle corresponding to where occlusion occurs is associated with a choice of orbit radius and a specific height over the target. Variation of the altitude, given a relatively constant specified orbit, would then suggest that the effect of a bank angle variation is approximately as follows in example Equation 22:

$$\Delta h \approx \frac{R_o}{\cos^2(\phi^*)}\Delta\phi \tag{22}$$

In an example scenario, if the maximum allowed bank angle, then $\phi_{max}=\phi^*=35°$ and if a 10° bank angle margin to occlusion is desired, for example, to account for turbulence, then approximately 260 feet (ft) additional height for a 300 meter (m) radius orbit would be necessitated.

$$\Delta h = \frac{300}{\cos^2(35°)} 10°\left(\frac{\pi}{180°}\right) \approx 260 \text{ ft}$$

According to examples disclosed herein, a criterion, such as a cone, or a surface can be defined and associated with the wing in the body-fixed frame. Accordingly, the orientation of the wings can be expressed in $F_b$ as:

$$\hat{y}_b = \begin{pmatrix} 0 \\ 1 \\ 0 \end{pmatrix}_b$$

In the local North-East-Down frame, this can be expressed as a function of aircraft orientation:

$$\hat{y}_b = \begin{pmatrix} \sin(\phi_c)\sin(\theta)\cos(\psi) - \cos(\phi_c)\sin(\psi) \\ \sin(\phi_c)\sin(\theta)\sin(\psi) + \cos(\phi_c)\cos(\psi) \\ \sin(\phi_c)\cos(\theta) \end{pmatrix}_{ned}$$

According to examples disclosed herein, a criterion that captures the LoS alignment may be accomplished as above, where the wing is captured within a cone. In such cases, a criterion can be similar to that in example Equation 11, where now:

$$c(t) = |\hat{y}_b^T \hat{1}| \quad (23)$$

and where:

$$\hat{1} = \frac{\vec{p}_{tgt} - \vec{p}_{AV}}{\|\vec{p}_{tgt} - \vec{p}_{AV}\|}$$

Hence, the critical condition is defined by example Equation 24:

$$\text{Wing-occlusion: } c^* \triangleq \{|\hat{y}_b^T \hat{1}| = 1\} \quad (24)$$

Alternatively, the angle between the LOS and the aircraft $x_b y_b$-plane can be captured, for example. Accordingly, this reference plane is defined by the $z_b$-axis, so that the plane can be expressed analytically as all vectors p such that:

$$z_b^T(\vec{p} - \vec{p}_{AV}) = 0$$

Hence, if the LoS is monitored, where $\vec{p} \equiv \vec{p}_{tgt}$, a critical condition can be defined as:

$$\text{Wing-occlusion: } c^* \triangleq \{|\hat{z}_b^T \hat{1}| = 0\} \quad (25)$$

Thus, according to examples disclosed herein, an error-signal can be associated with this criterion as follows:

$$f(t) = 90° - \arccos(c(t)) \quad (26)$$

and provided back to adjust the bank angle limit as in example Equation 21, $$\Delta\Phi = \frac{(f_0 - f(t))}{(f_0 - \varepsilon)}\Delta\Phi_\varepsilon$$

Rather than allow the orbit radius to change to accommodate this bank angle, the expression of the approximation in example Equation 22 to command a change in altitude can be defined as below:

$$\Delta h_c = \frac{R_o}{\cos^2(\phi_{max})}\Delta\Phi \quad (27)$$

According to examples disclosed herein, because the nature of an altitude change is distinct from the high bandwidth banking maneuver, a bank-limiting control can be combined with altitude change with some degree of control to prevent unstable coupling of bank limit to radius.

Figure 14A:
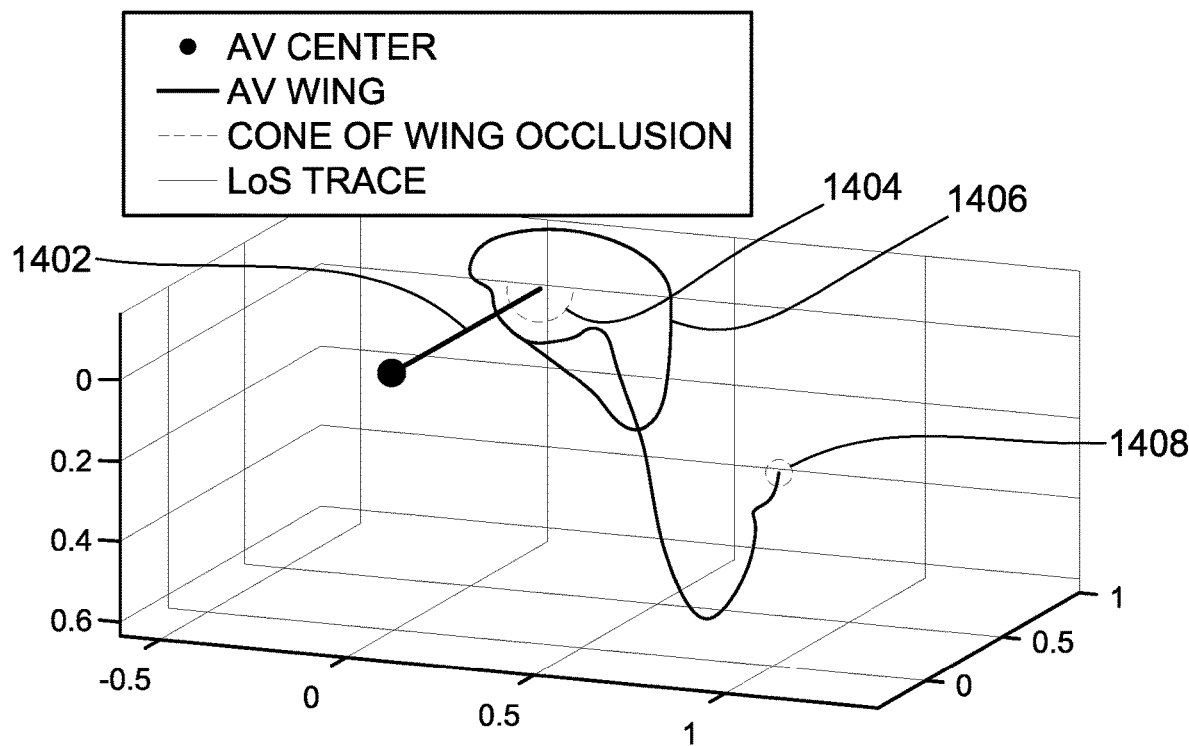
FIGS. 14A-15B depict example scenarios in which a bank angle limit causes a deviation from orbit.
Figure 14B:
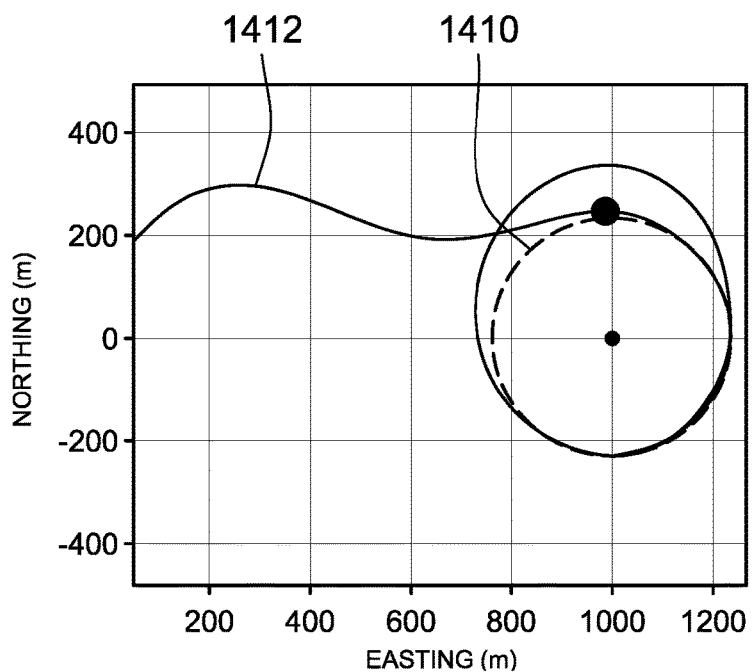

Examples disclosed herein can utilize bank angle limiting in combination with attitude variation. An example application of bank angle limiting combined with altitude variation is demonstrated in FIGS. 14A-16B. FIGS. 14A-14C illustrate the results of wind, and the associated orbit variation that would be necessitated based on holding altitude relatively constant. FIGS. 16A and 16B demonstrate how the use of the alignment criterion can ameliorate the orbit deviation significantly while effectively avoiding occlusion of the target.

Examples disclosed herein can also account for limited tilt payloads. For example, the 90° criterion in example Equation 26 can account for payloads that cannot tilt a full 90°. In a particular example, if the belly-mounted payload can tilt-up to 60°, then the criterion can be formulated as:

$$\hat{z}_b^T \frac{(\vec{p}_{tgt} - \vec{p}_{AV})}{\|\vec{p}_{tgt} - \vec{p}_{AV}\|} \geq \cos(60°)$$

Equivalently, an angular expression for feedback of this criterion can be defined as:

$$f(t) = 60° - \arccos(c(t))$$

and the change in bank angle limit is again obtained as in example Equation 21:

$$\Delta\Phi = \frac{K_\Phi}{(f_{criterion} - 2°)}$$

Examples disclosed herein can take into account variation of criterion. FIGS. 6 and 7 illustrate a bank angle limit as a linear function of the LoS alignment criterion. According to examples disclosed herein, more aggressive functions can also be possible and can provide a different character with a stronger repulsive force or penalty closer to the alignment. For example, a quadratic penalty or a pole-like penalty based on an inverse with respect to FIG. 17 can be implemented. Such an example reflects the utilization of a criterion where full alignment equates to $f_{criterion}=0$ and the critical cone is defined as $f_{criterion} \leq 2°$, and the limit is proportional to the inverse of the LoS-alignment angle:

$$\Delta \Phi = \frac{(f_0 - f(t))}{(f_0 - \varepsilon)}$$

where, in this example, $\Delta \Phi$ is limited to a maximum of 20°.

Examples disclosed herein can be utilized for predictive mission assessment. An example variation for this utilization of attitude limiting is path planning, where the path to be followed is adjusted for a relatively clear LoS. This has the advantage that the path can be predicted and displayed to the operator. Path variation due to wind can be relatively (e.g., fully) predictable.

Some examples disclosed herein can be utilized for radar cross section reduction and/or minimization. In such examples, the criterion can be formulated as an attractor, where the criterion is purposely reduced and/or minimized. This can be applicable to scenarios where a relatively constant LoS is desired, for example, with limited view fixed cameras, to reduce (e.g., minimize) radar-cross-section returns, or noise footprint considerations. In other words, examples disclosed herein can be utilized for evasion and/or minimizing detection thereof.

The example calculations described above are only examples and appropriate other calculations and/or methodologies can be implemented, instead. Further, any other appropriate parameters and/or variables can be analyzed, instead.

While an example manner of implementing the vehicle guidance system 300 of FIG. 1 is illustrated in FIG. 3, one or more of the elements, processes, and/or devices illustrated in FIG. 3 may be combined, divided, re-arranged, omitted, eliminated, and/or implemented in any other way. Further, the example position/orientation analyzer 302, the example 306, the example flight path adjuster circuitry 308, the example guidance system circuitry 310, and/or, more generally, the example vehicle guidance system 300 of FIG. 3, may be implemented by hardware alone or by hardware in combination with software and/or firmware. Thus, for example, any of the example position/orientation analyzer 302, the example alignment calculator circuitry 304, the example flight path calculator circuitry 306, the example flight path adjuster circuitry 308, the example guidance system circuitry 310, and/or, more generally, the example vehicle guidance system 300, could be implemented by programmable circuitry in combination with machine readable instructions (e.g., firmware or software), processor circuitry, analog circuit(s), digital circuit(s), logic circuit(s), programmable processor(s), programmable microcontroller (s), graphics processing unit(s) (GPU(s)), digital signal processor(s) (DSP(s)), ASIC(s), programmable logic device (s) (PLD(s)), and/or field programmable logic device(s) (FPLD(s)) such as FPGAs. Further still, the example vehicle guidance system 300 of FIG. 3 may include one or more elements, processes, and/or devices in addition to, or instead of, those illustrated in FIG. 3, and/or may include more than one of any or all of the illustrated elements, processes and devices.

Figure 4:
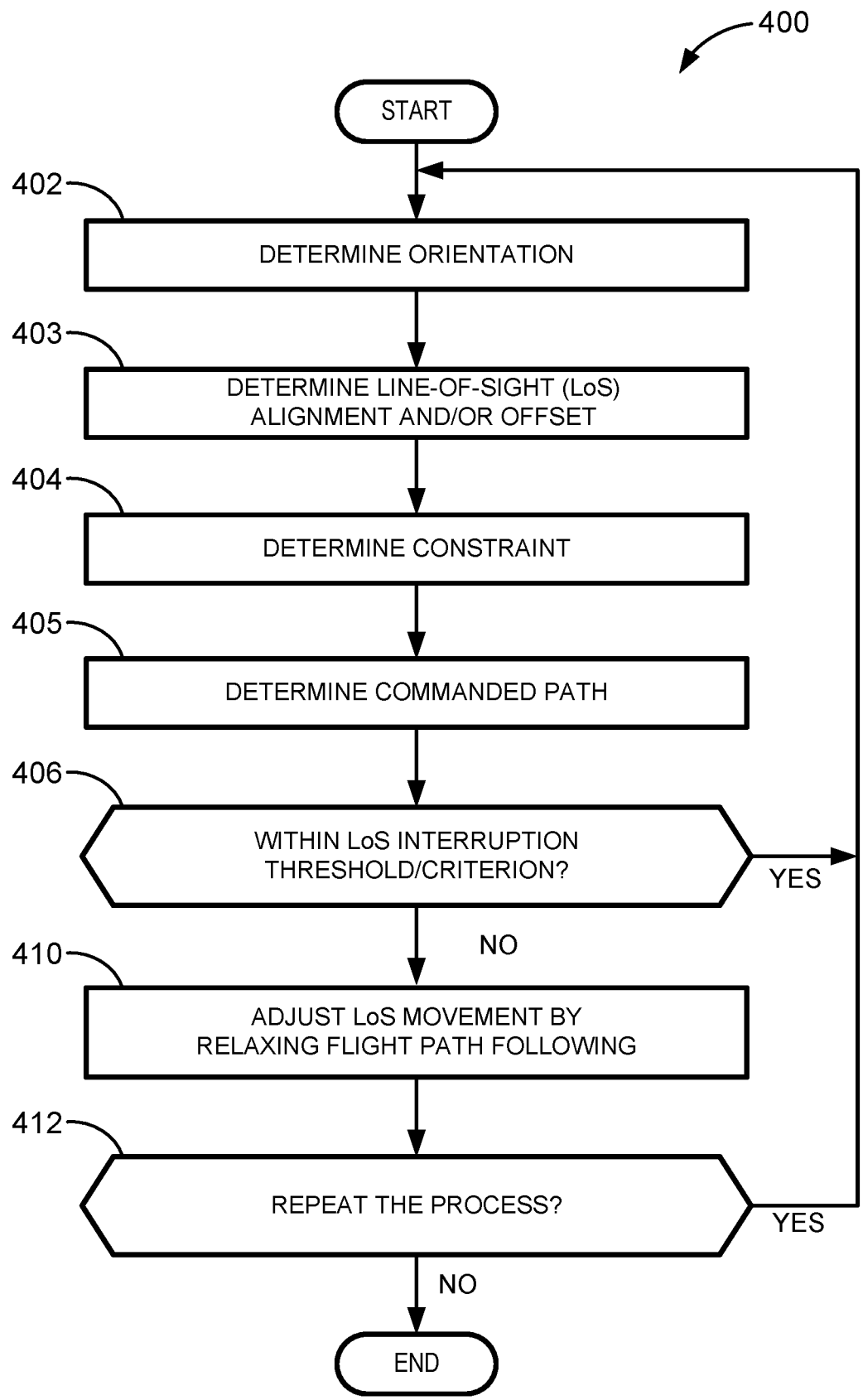
FIG. 4 is a flowchart representative of example machine readable instructions and/or example operations that may be executed, instantiated, and/or performed by example programmable circuitry to implement the example vehicle guidance system of FIG. 3.

The Flowchart representative of example machine readable instructions, which may be executed by programmable circuitry to implement and/or instantiate the vehicle guidance system 300 of FIG. 3 and/or representative of example operations which may be performed by programmable circuitry to implement and/or instantiate the vehicle guidance system 300 of FIG. 3, are shown in FIG. 4. The machine readable instructions may be one or more executable programs or portion(s) of one or more executable programs for execution by programmable circuitry such as the programmable circuitry 1812 shown in the example processor platform 1800 discussed below in connection with FIG. 18 and/or may be one or more function(s) or portion(s) of functions to be performed by the example programmable circuitry (e.g., an FPGA) discussed below in connection with FIGS. 19 and/or 20. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 4, many other methods of implementing the example vehicle guidance system 300 may alternatively be used. For example, the order of execution of the blocks of the flowchart may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 4 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 4 is a flowchart representative of example machine readable instructions and/or example operations 400 that may be executed, instantiated, and/or performed by programmable circuitry to enable guidance of a vehicle, such as the example aircraft 100, while enforcing LoS requirements thereof. The example machine-readable instructions and/or the example operations 400 of FIG. 4 begin at block 402, at which the position/orientation analyzer circuitry 302 determines an orientation of the aircraft 100. According to some examples disclosed herein, a projected orientation, orientation ranges and/or sequence of orientations of the aircraft 100 is determined based on a flight path (e.g., a predetermined flight path, a flight path based on heading, a flight path determined in a conventional manner, etc.).

At block 403, the example alignment calculator circuitry 304 determines an LoS alignment and/or offset (e.g., an LoS deviation, an LoS deviation range). For example, the alignment calculator circuitry 304 determines a degree of the LoS offset/alignment and/or degree of gimbal lock with respect to the flight path. The alignment calculator circuitry 304 may determine the LoS alignment/offset that is projected and/or predicted based on the flight path (e.g., the current flight path).

At block 404, the alignment calculator circuitry 304 of the illustrated example determines and/or calculates a constraint (e.g., a movement constraint) of the aircraft 100. In particular, the alignment calculator circuitry 304 determines an orientation constraint (e.g., a movement constraint, a bank angle limitation, a bank angle limitation based) based on at least one heading (e.g., multiple headings of the aircraft 100 based on headings of the flight path, etc.) for LoS enforcement. In some examples, the constraint is related to avoiding a gimbal lock of a device carried by the aircraft 100. Additionally or alternatively, the example alignment calculator circuitry 304 develops the constraint as a function such that the constraint can vary over a position of the aircraft 100, an orientation of the aircraft 100, a heading of the aircraft 100, a speed of the aircraft 100 and/or a time of travel, etc. (e.g., the constraint is a function of a heading or a heading over time of the aircraft 100, etc.).

According to the illustrated example of FIG. 4, at block 405, in some examples, the flight path calculator circuitry 306 determines the commanded flight path of the aircraft 100 to maintain the LoS offset/alignment within an LoS threshold/criterion. In this example, the flight path calculator circuitry 306 determines bank-to-turn logic and/or instructions that enable the aircraft 100 to maintain the LOS offset/alignment within the threshold/criterion, thereby enforcing LoS requirements. The LoS requirements can pertain to a device carried by the aircraft 100 and/or a functional vector associated with the aircraft 100 and/or the device.

At block 406, the example alignment calculator circuitry 304 determines whether the LoS offset/alignment is within the LoS threshold/criterion. If the LoS offset/alignment is within the LoS threshold/criterion (block 406), the process returns to block 402. Otherwise, the process proceeds to block 410.

At block 410, the example flight path adjuster circuitry 308 adjusts LOS and/or LoS movement of the aircraft 100 for LoS enforcement by relaxing flight path following. Additionally or alternatively, the example flight path circuitry adjuster 308 adjusts and/or generates a commanded flight path for LoS enforcement. For example, the flight path adjuster circuitry 308 can lengthen and/or alter a general shape of the commanded flight path to maintain LoS enforcement and/or comply with LoS requirements. In such examples, the flight path adjuster circuitry 308 can affectively lengthen and/or change a shape of a path length for the aircraft 100. In other words, the flight path adjuster circuitry 308 can extend a distance the aircraft 100 travels to ensure enforcement of the LoS requirements.

In the illustrated example of FIG. 4, at block 412, the alignment calculator circuitry 304 determines whether to repeat the process. If the process is to be repeated (block 412), control of the process returns to block 402. Otherwise, the process ends. The determination may be based on whether the aircraft 100 has deviated from the commanded flight path and/or whether the aircraft is or has violated the LoS enforcement. Additionally or alternatively, the determination is based on the aircraft 100 necessitating further guidance (e.g., the aircraft 100 has landed).

Figure 5:
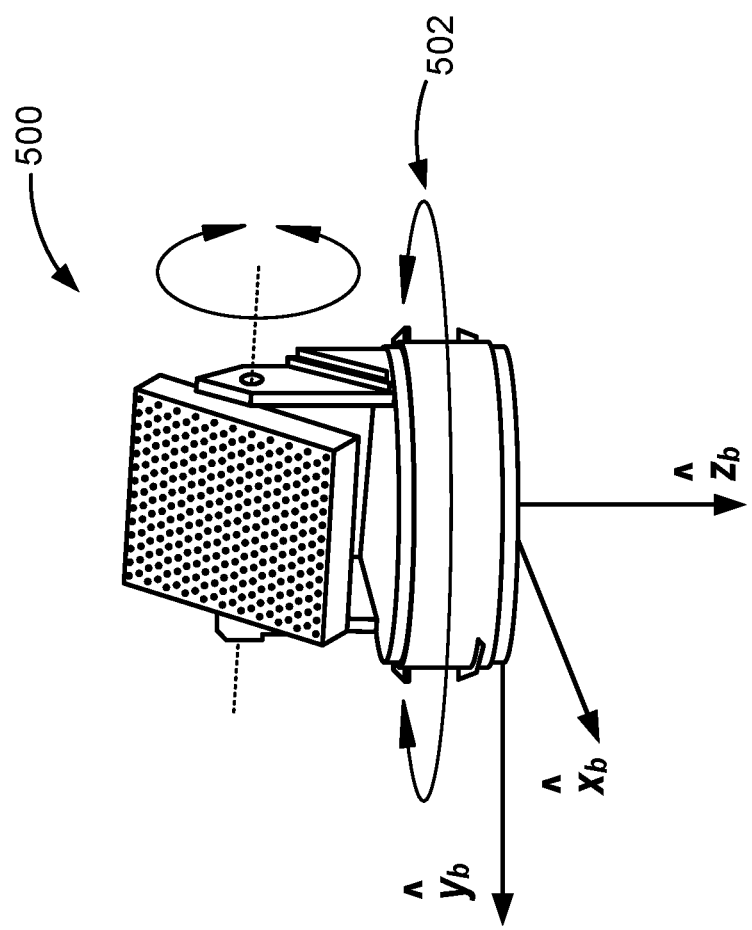
FIG. 5 depicts an example sensor that can be implemented in examples disclosed herein.

FIG. 5 depicts an example sensor 500 that can be implemented in examples disclosed herein. The sensor 500 of the illustrated example is utilized for LoS applications and includes a movable body (e.g., a gimbal) 502. Satellite communication (satcom) can necessitate an antenna of the sensor 500 that is directed (e.g., faced toward a target). When the antenna is mounted to a moving vehicle, the antenna is actively and continuously aimed to compensate for vehicle motion while enabling proper operation thereof. In example of a fixed wing AV (e.g., a UAV), nominal vehicle motion can be predicted from kinematics. Use of the kinematics enables formulation and demonstration of a method to limit bank angles based on the alignment of the LOS and demonstrate its effects on path following. FIG. 5 depicts an example device that can enable a small tactical UAV to be deployed with satcom capabilities. A GetSat Nano terminal, for example, is a relatively small and lightweight satcom terminal that can be utilized. This terminal can rotate 360° in azimuth, and up to 90° in elevation, which can correspond to a possibility of a gimbal lock (e.g., a singularity), which is to be avoided, at top-dead-center.

FIG. 6 is a graph depicting an example control scheme that can be implemented in examples disclosed herein. In this example, the bank angle adjustment is a linear function of the alignment criterion, and defined by the parameters $f_0$, $\varepsilon$, and $\Delta\varphi_\varepsilon$. The initial onset of bank-limiting is set by $f_0$ and $\{\varepsilon, \Delta\Phi_\varepsilon\}$ determine the slope. According to examples disclosed herein, the feedback for bank angle limit adjustment can be defined by example Equation 21 such that the alignment criterion is defined by:

$$f(t) = \arccos(c(t)),$$

where $c(t)=c^*=1$. In this example, a vertical axis 602 represents the bank angle adjustment while the horizontal axis 604 represents the alignment criteria.

FIG. 7 is an example graph depicting an example effect on bank angle control limiting. In particular, a use of criterion limits with respect to a commanded bank is shown. As can be seen in the illustrated example of FIG. 7, a bank angle limit 702 is shown as the upper limit.

FIG. 8 depicts example satellite geometry analyzed in conjunction with examples disclosed herein. In the illustrated view of FIG. 8, the example satellite 800 orbits a planet 801. In this example, a line 802 represents an LoS to a point 804 representing a local area of operations with respect and a line 806 represents a line from the satellite 800 to an equator of the planet 801. Further, an angle 808 represents an elevation angle $\delta$ while an angle 810 represents a latitude. Accordingly, the elevation angle is equivalent to 90°−(latitude+$\delta$).

Figure 9:
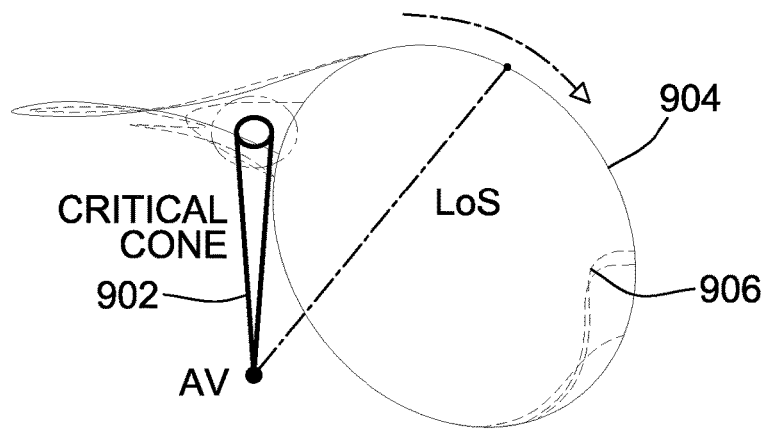
FIGS. 9 and 10 represent aspects of LoS tracing.
Figure 10:
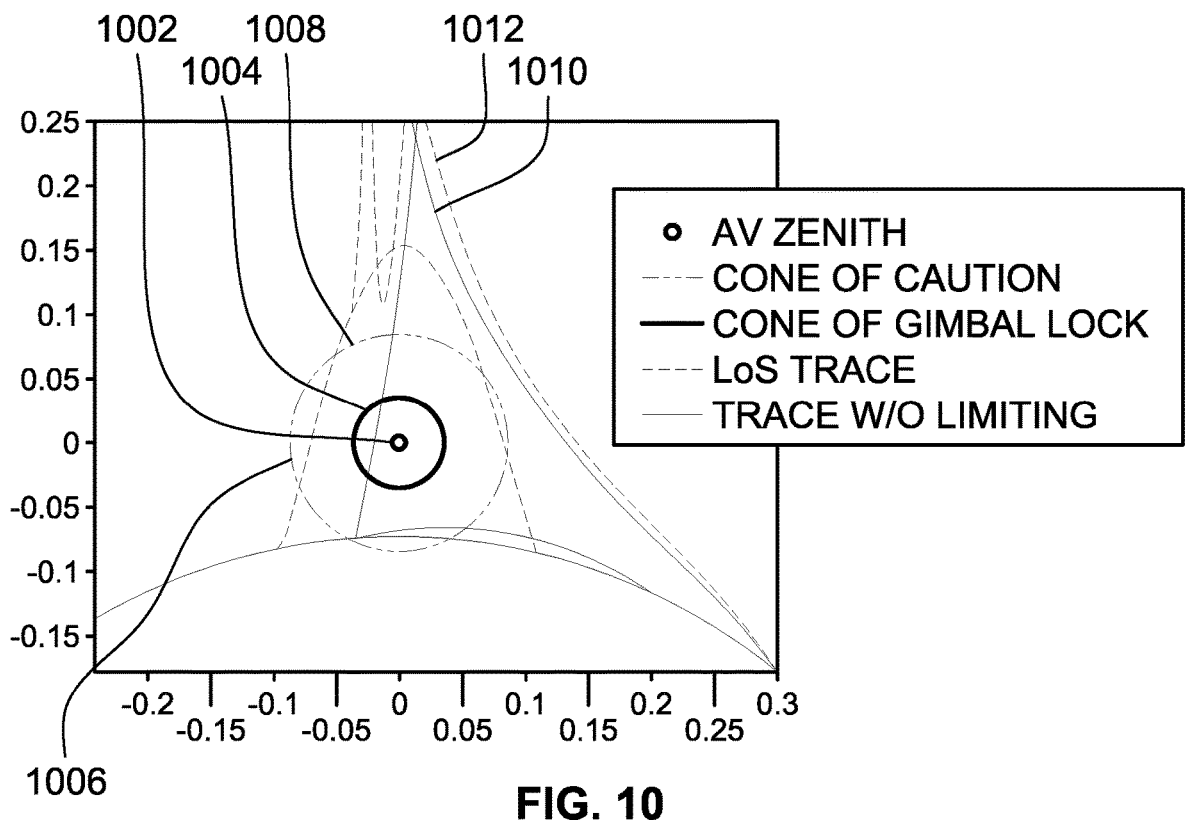

FIGS. 9 and 10 represent aspects of LoS tracing. Turning to FIG. 9, a critical cone 902 is depicted with a trace (without limiting) 904 and an LoS trace 906. FIG. 10 depicts an AV zenith 1002 corresponding to a cone of gimbal lock 1004. Further, a zone of caution 1006 is shown with an LoS trace 1008. In the illustrated view, a trace without limiting 1010 is shown with respect to an LoS trace 1012. In this example, LoS tracing demonstrates successful prevention of a gimbal lock. Without limiting, communications can be lost, as indicated by the trace 904 traversing the critical cone 902 of FIG. 9. With the limiting criterion engaged, the aforementioned LoS traces indicate whether the aircraft bank angle was sufficiently adjusted to prevent the critical cone 902 to be intersected and, thus, preventing gimbal lock.

Figure 11:
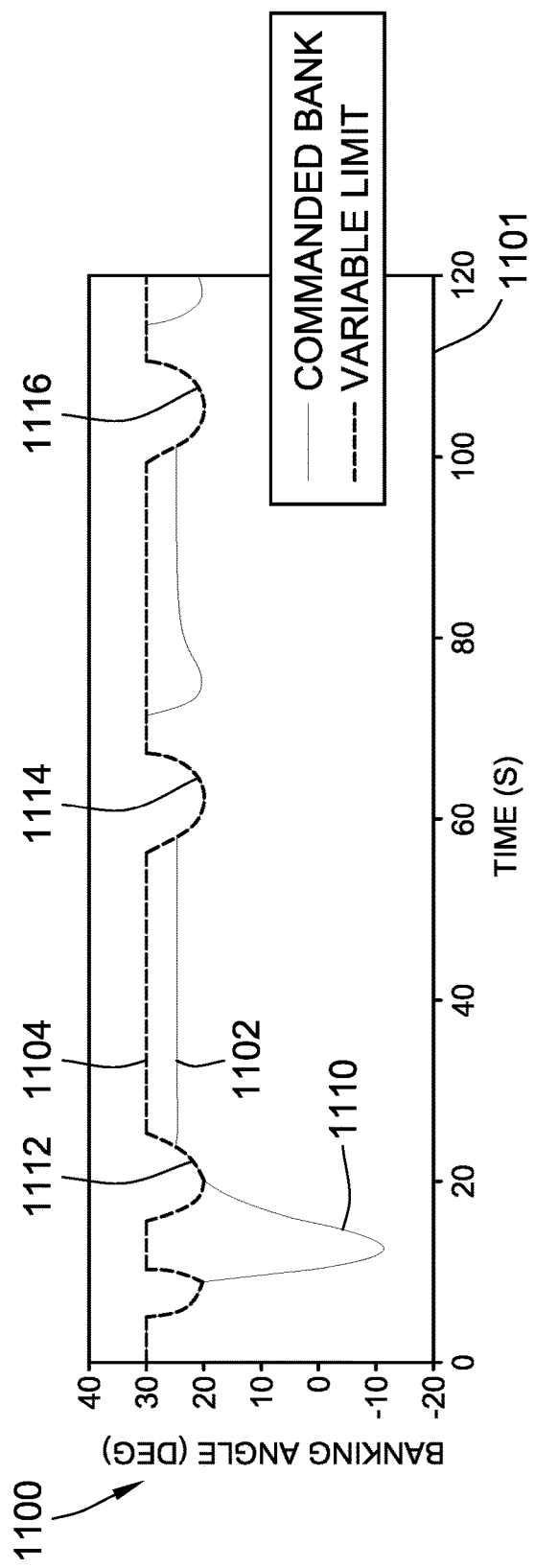
FIG. 11 is an example graph depicting a control scheme corresponding to a commanded bank angle.

FIG. 11 is an example graph depicting a control scheme corresponding to a commanded bank angle. In this example, a vertical axis 1100 represents a banking angle while a horizontal axis 1101 represents time in seconds(s). In this example, a curve 1102 represents a commanded bank such that an AV is maneuvering with a region/portion 1110 of the curve 1102 corresponding to a bank and/or movement of the AV. In this example, at region 1112, the AV avoids alignment of LoS with an area that can be referred to as a "dead zone." Further, regions 1114, 1116 represent the AV having a deviation from an orbit that is predictable, as well as contained.

Figure 12A:
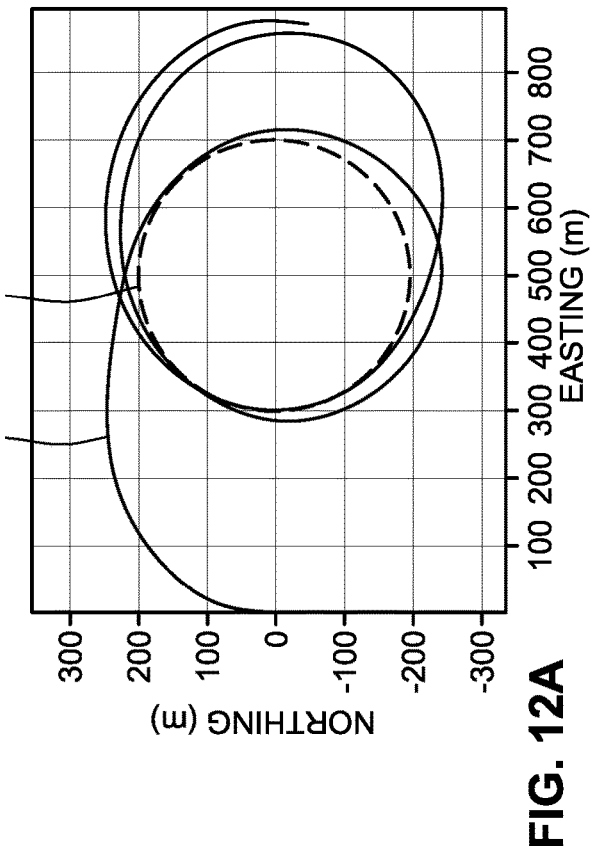
FIGS. 12A-12C depict example aspects of an LOS induced flight path adjustment.
Figure 12B:
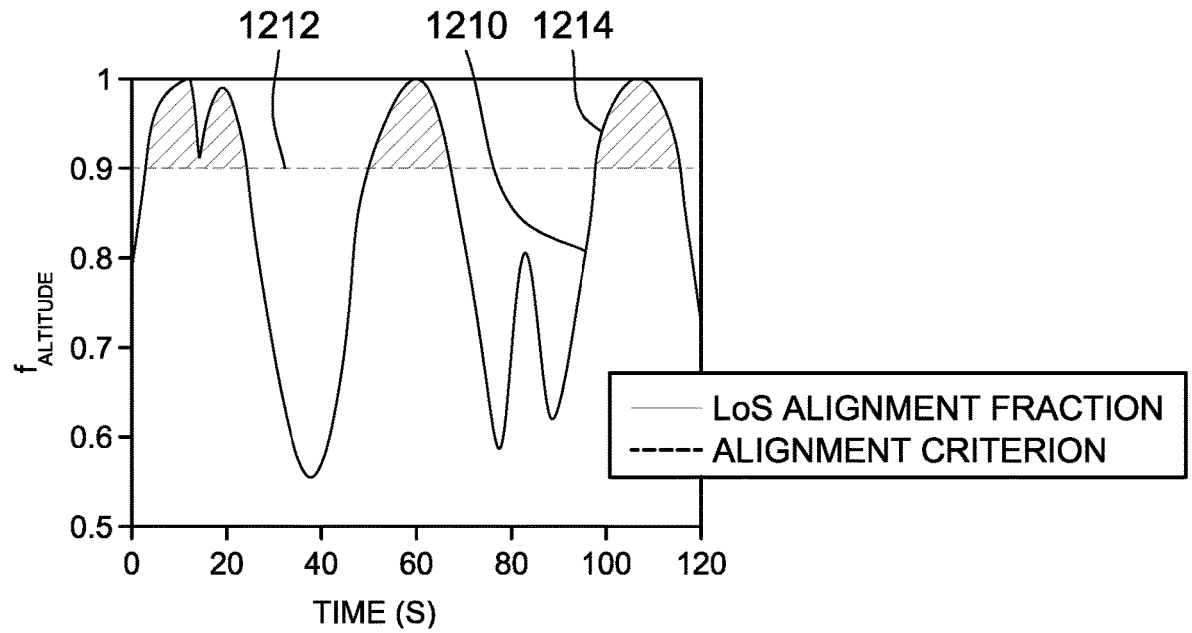
Figure 12C:
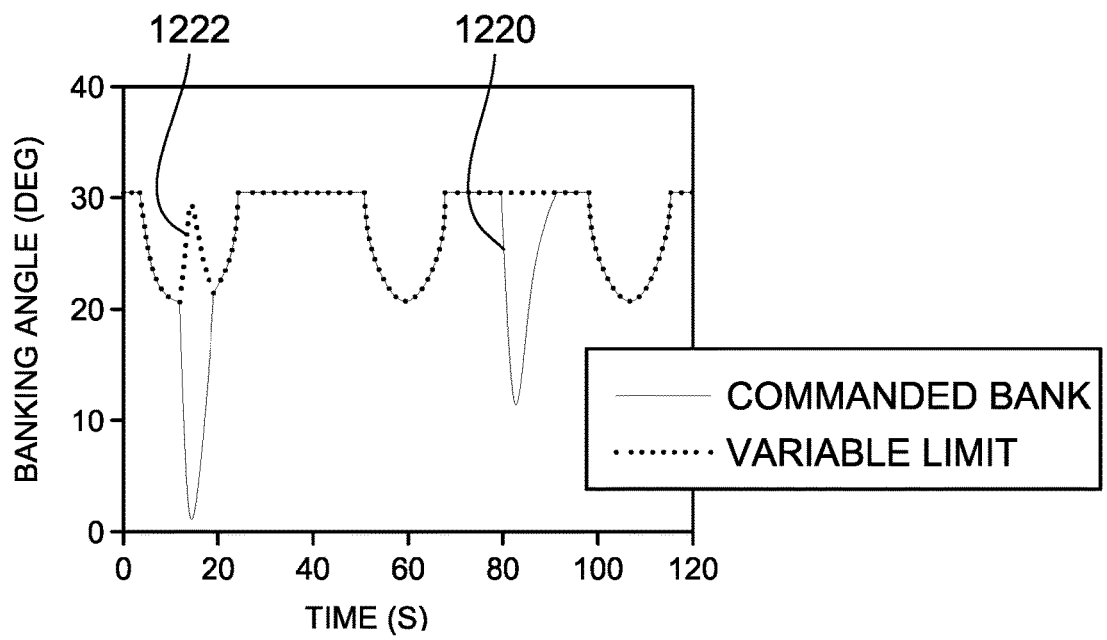

FIGS. 12A-12C depict example aspects of an LOS induced flight path adjustment. In the illustrated views of FIGS. 12A-12C, an LoS is guaranteed and/or enforced by adjustment of an orbit to satisfy the alignment-criterion. Turning to FIG. 12A, a variable limit 1202 is shown with respect to a commanded bank 1204. As can be seen in the illustrated example of FIG. 12A, the effect of Helmsman and bank angle limiting corresponds to temporarily wider orbit tracking, as seen in the commanded bank 1204.

FIG. 12B is an example graph depicting gimbal lock criterion that is indicated as a function of an orientation of an AV. In this example, an LoS alignment fraction 1210 is shown with respect to a criterion 1212, thereby defining regions 1214.

Turning to FIG. 12C, a commanded bank 1220 is shown in conjunction with a variable limit 1222. In the illustrated example of FIG. 12C, bank angle is automatically limited and/or controlled to prevent gimbal lock. In other words, LoS criteria is enforced, thereby reducing deviations.

Figure 13:
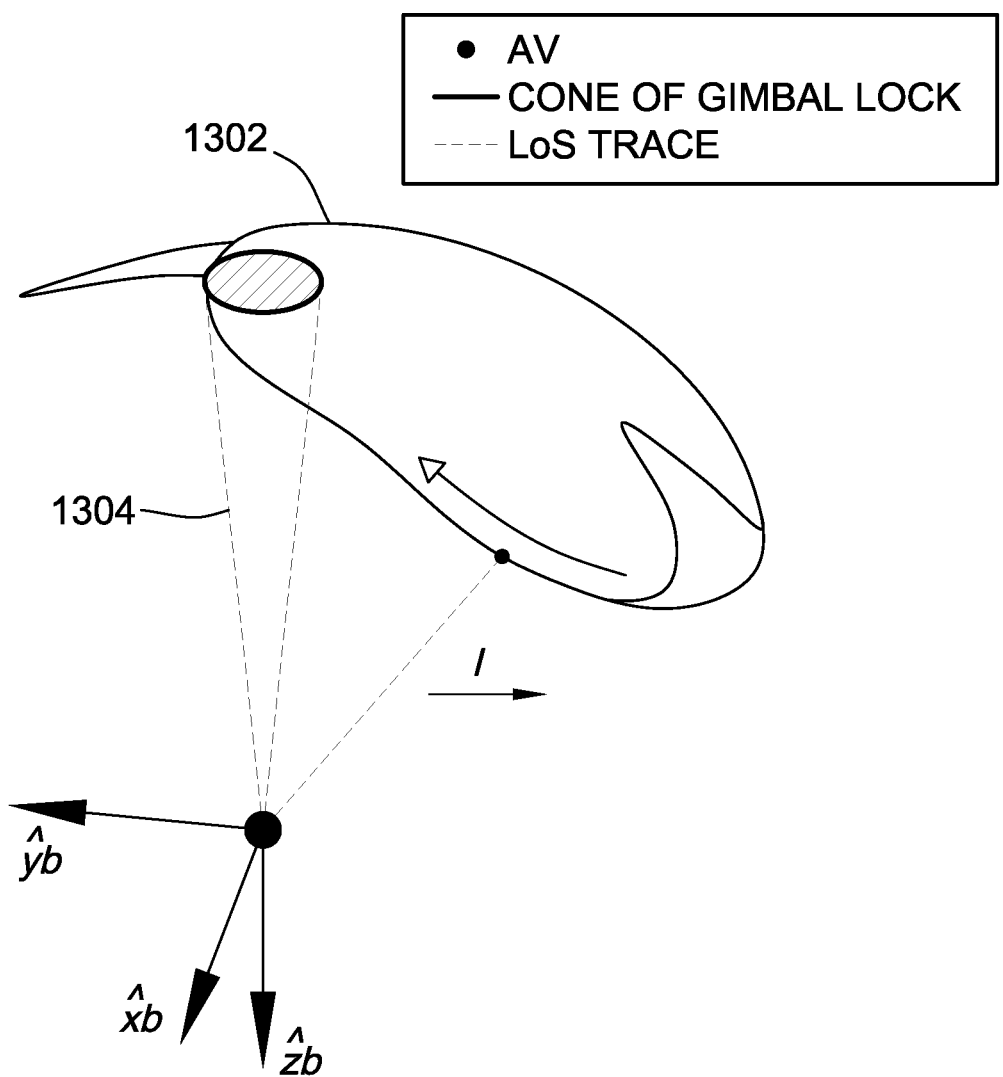
FIG. 13 depicts example aspects of an LoS trace relative to a vehicle.

FIG. 13 depicts example aspects of an LoS trace relative to an AV. In the illustrated example of FIG. 13, the trace of the LoS from an AV perspective confirms that gimbal lock is avoided, and, as a result, satcom is not compromised. In this example, an LoS trace 1302 is shown in conjunction with a cone of gimbal lock 1304.

FIGS. 14A-15B depict example scenarios in which a bank angle limit causes a deviation from orbit. FIGS. 14A and 14B depict an example scenario taking into account wind effects such that a bank angle limit causes a deviation from orbit and a target is occluded by a wing (e.g., an LoS trace encircles a wing tip). In the illustrated example of FIG. 14A, a wing is represented by a line 1402 extending from a center of an AV. A cone of wing occlusion 1404 is shown along with an LOS trace 1406. In this example, a cone of wing occlusion 1408 is also shown.

FIG. 14B depicts a standard orbit 1410 in conjunction with an orbit deviation 1412. In the illustrated examples of FIGS. 14A and 14B, while the AV is in a relatively tight orbit corresponding to a maximum bank angle limit, wing occlusion can occur due to wind, as exemplified by the LoS trace 1406 encircling a tip of the wing of the AV represented by the line 1402.

Figure 15A:
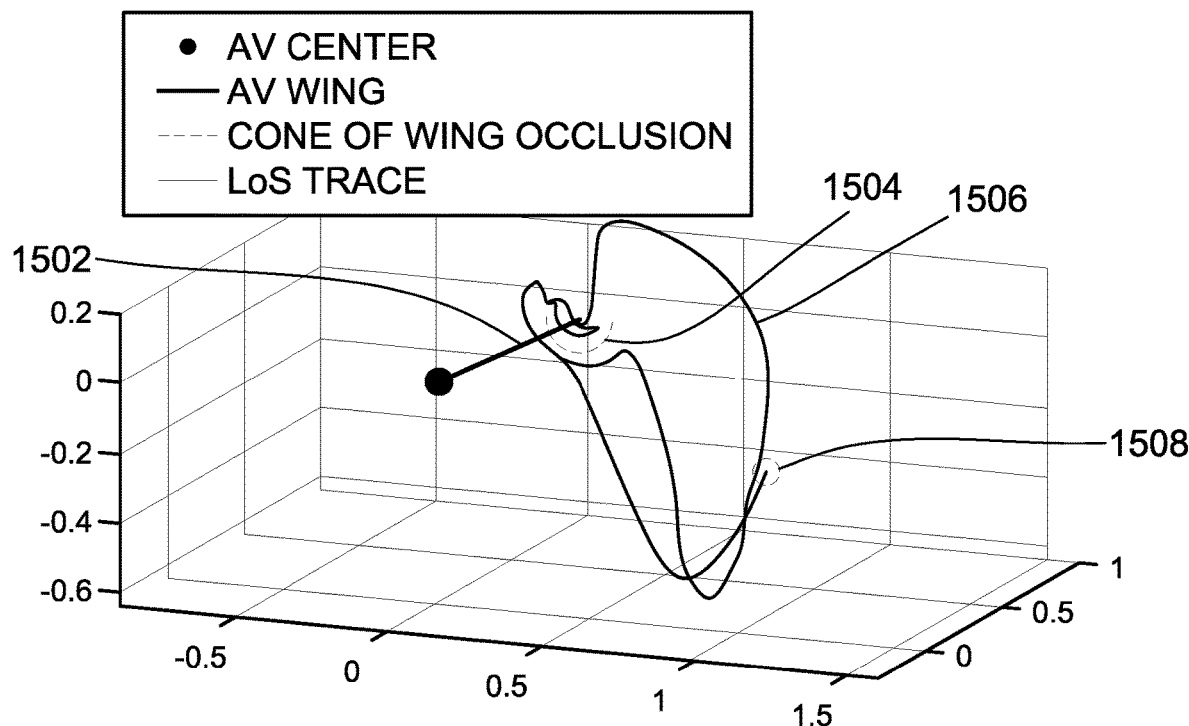
Figure 16A:
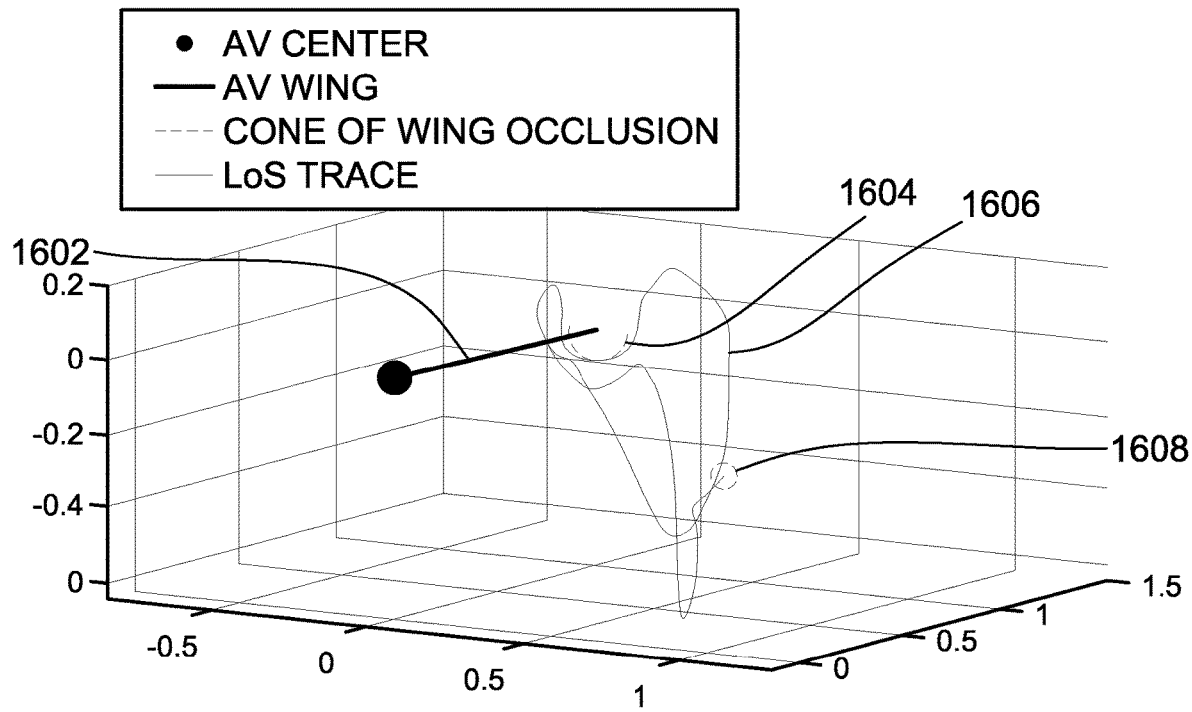
FIGS. 16A and 16B depict example avoidance of a wing occlusion, as shown in FIG. 1C.
Figure 16B:
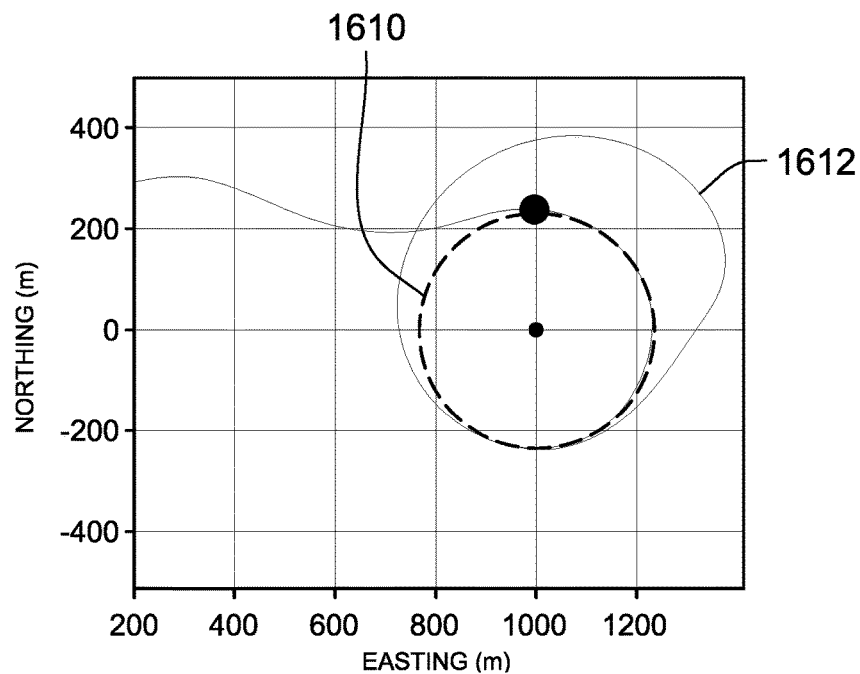

Turning to FIG. 15A, a wing is represented by a line 1502 extending from a center (e.g., a center of mass, a geometric center, etc.) of an AV. Further, A cone of wing occlusion 1504 is shown with an LoS trace 1506. In this example, a cone of wing occlusion 1508 is also shown.

Figure 15B:
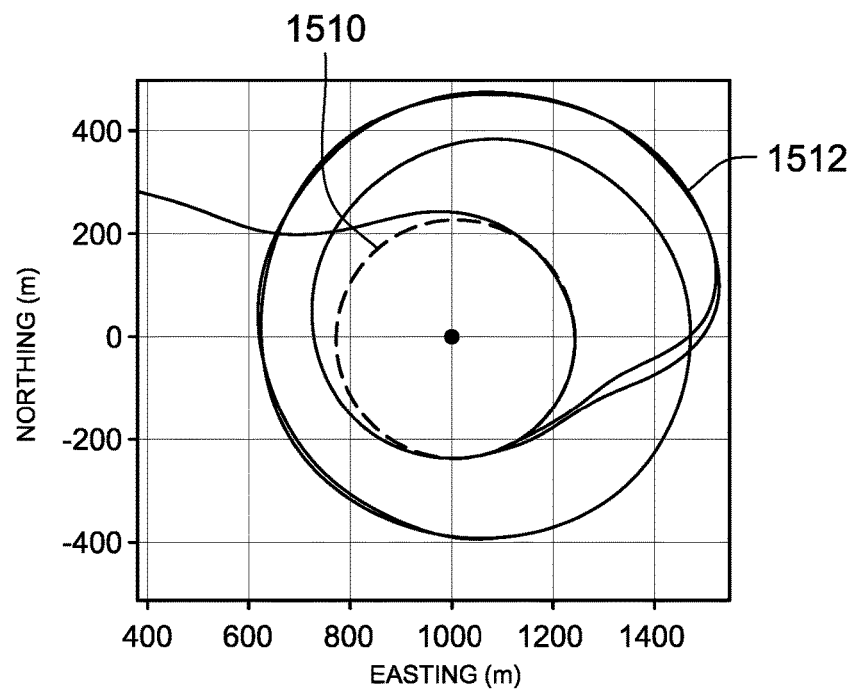

FIG. 15B depicts a standard orbit 1510 in conjunction with an orbit deviation 1512 corresponding to LoS adjustments. In this example, at a relatively constant altitude, bank angle limiting can be capable of ensuring a relatively unobstructed LoS, which can result in relatively large orbit deviations, as depicted in FIG. 15B. As can be seen in FIG. 15B, bank angle limiting alone to prevent occlusion can result in a large deviation from a desired orbit.

FIGS. 16A and 16B depict example avoidance of a wing occlusion, as shown and described above in connection with FIG. 1C. Turning to FIG. 16A, in this example, a wing is represented by a line 1602 extending from a center of an AV. Further, a cone of wing occlusion 1604 is shown with respect to an LoS trace 1606, and another cone of wing occlusion 1608 is also depicted. In the illustrated example of FIG. 16A, wing occlusion is avoided based on a combination of reduced orbit change and coordinated attitude variation.

FIG. 16B is another view depicting a standard orbit 1610 with a bounded orbit deviation 1612. According to examples disclosed herein, with coordinated attitude variation, bank angle limiting is enabled to assure a relatively unobstructed LoS with the bounded deviation orbit 1612. In other words, attitude variation can enhance bank angle limiting, for example.

Figure 17:
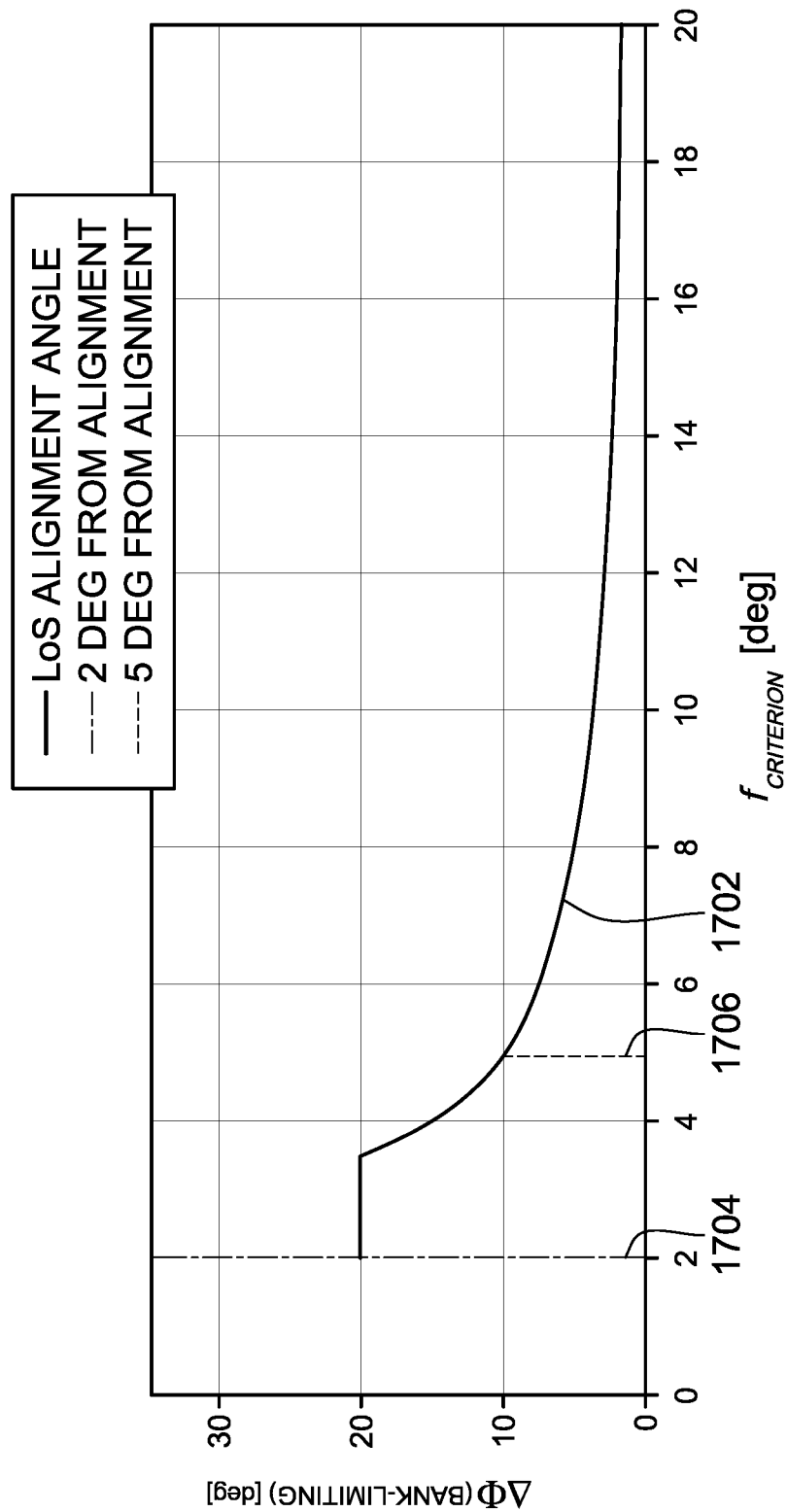
FIG. 17 is an example graph depicting example LoS criteria.

FIG. 17 is an example graph depicting example LoS criteria. In this example, an alternative to the limiting criterion in FIG. 6 is to utilize the criterion in an inverse with its pole located at the critical angle. In this example, a curve 1702 represents an LoS alignment angle while a line 1704 represents 2° from alignment and a line 1706 represents 5° from alignment. However, any other appropriate criteria can be implemented instead.

Figure 18:
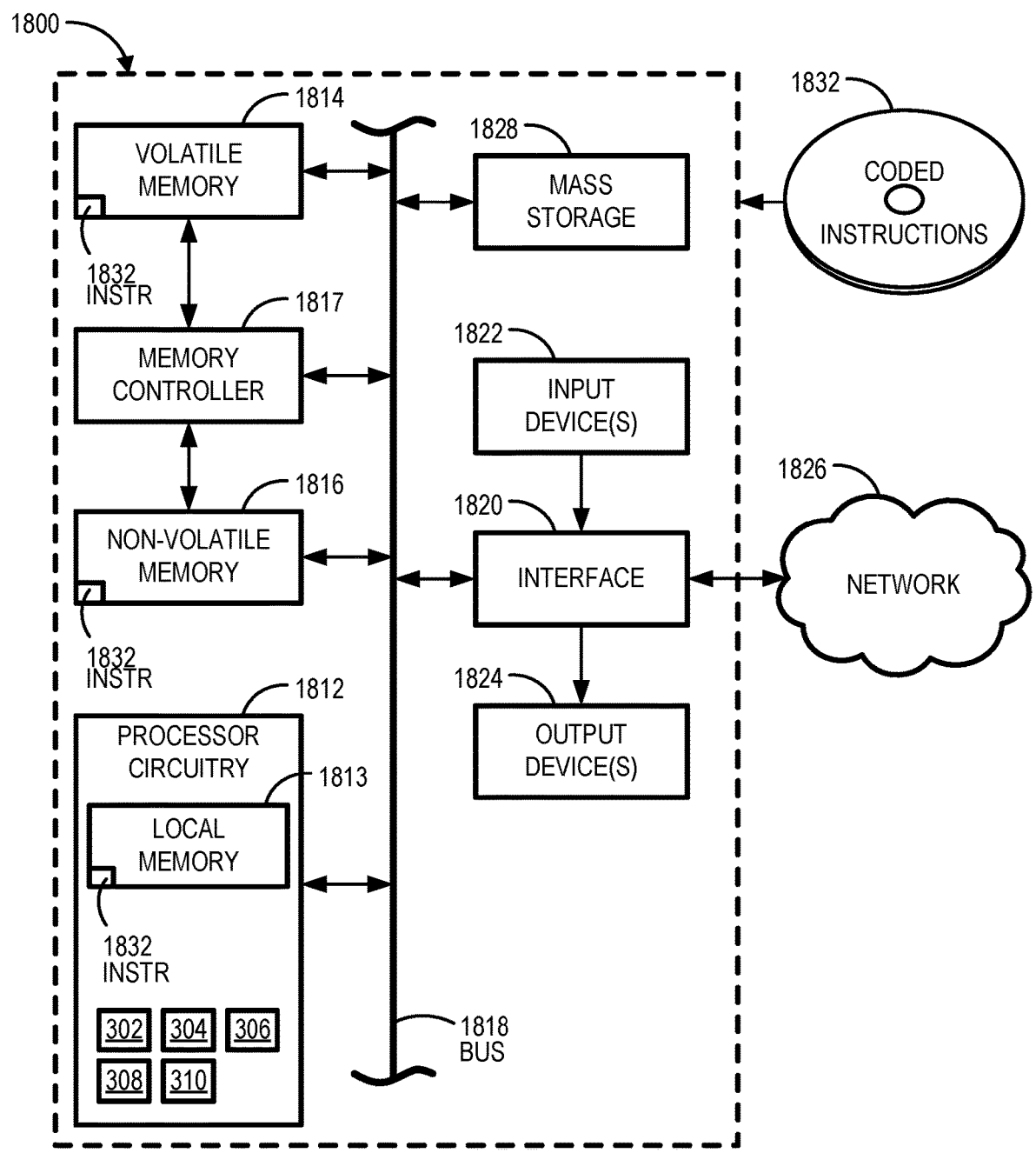
FIG. 18 is a block diagram of an example processing platform including programmable circuitry structured to execute, instantiate, and/or perform the example machine readable instructions and/or perform the example operations of FIG. 4 to implement the vehicle guidance system 300 of FIG. 3.

FIG. 18 is a block diagram of an example programmable circuitry platform 1800 structured to execute and/or instantiate the example machine-readable instructions and/or the example operations of FIG. 4 to implement the vehicle guidance system 300 of FIG. 3. The programmable circuitry platform 1800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1800 of the illustrated example includes programmable circuitry 1812. The programmable circuitry 1812 of the illustrated example is hardware. For example, the programmable circuitry 1812 can be implemented by one or more integrated circuits, logic circuits, FPGAs, microprocessors, CPUs, GPUs, DSPs, and/or microcontrollers from any desired family or manufacturer. The programmable circuitry 1812 may be implemented by one or more semiconductor based (e.g., silicon based) devices. In this example, the programmable circuitry 1812 implements the example position/orientation analyzer 302, the example 306, the example flight path adjuster circuitry 308, and the example guidance system circuitry 310.

The programmable circuitry 1812 of the illustrated example includes a local memory 1813 (e.g., a cache, registers, etc.). The programmable circuitry 1812 of the illustrated example is in communication with main memory 1814, 1816, which includes a volatile memory 1814 and a non-volatile memory 1816, by a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1816 may be implemented by flash memory and/or any other desired type of memory device. Access to the main memory 1814, 1816 of the illustrated example is controlled by a memory controller 1817. In some examples, the memory controller 1817 may be implemented by one or more integrated circuits, logic circuits, microcontrollers from any desired family or manufacturer, or any other type of circuitry to manage the flow of data going to and from the main memory 1814, 1816.

The programmable circuitry platform 1800 of the illustrated example also includes interface circuitry 1820. The interface circuitry 1820 may be implemented by hardware in accordance with any type of interface standard, such as an Ethernet interface, a universal serial bus (USB) interface, a Bluetooth® interface, a near field communication (NFC)

interface, a Peripheral Component Interconnect (PCI) interface, and/or a Peripheral Component Interconnect Express (PCIe) interface.

In the illustrated example, one or more input devices 1822 are connected to the interface circuitry 1820. The input device(s) 1822 permit(s) a user (e.g., a human user, a machine user, etc.) to enter data and/or commands into the programmable circuitry 1812. The input device(s) 1822 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1824 are also connected to the interface circuitry 1820 of the illustrated example. The output device(s) 1824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1820 of the illustrated example, thus, typically includes a graphics driver card, a graphics driver chip, and/or graphics processor circuitry such as a GPU.

The interface circuitry 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1826. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1800 of the illustrated example also includes one or more mass storage discs or devices 1828 to store firmware, software, and/or data. Examples of such mass storage discs or devices 1828 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1832, which may be implemented by the machine readable instructions of FIG. 4, may be stored in the mass storage device 1828, in the volatile memory 1814, in the non-volatile memory 1816, and/or on at least one non-transitory computer readable storage medium such as a CD or DVD which may be removable.

Figure 19:
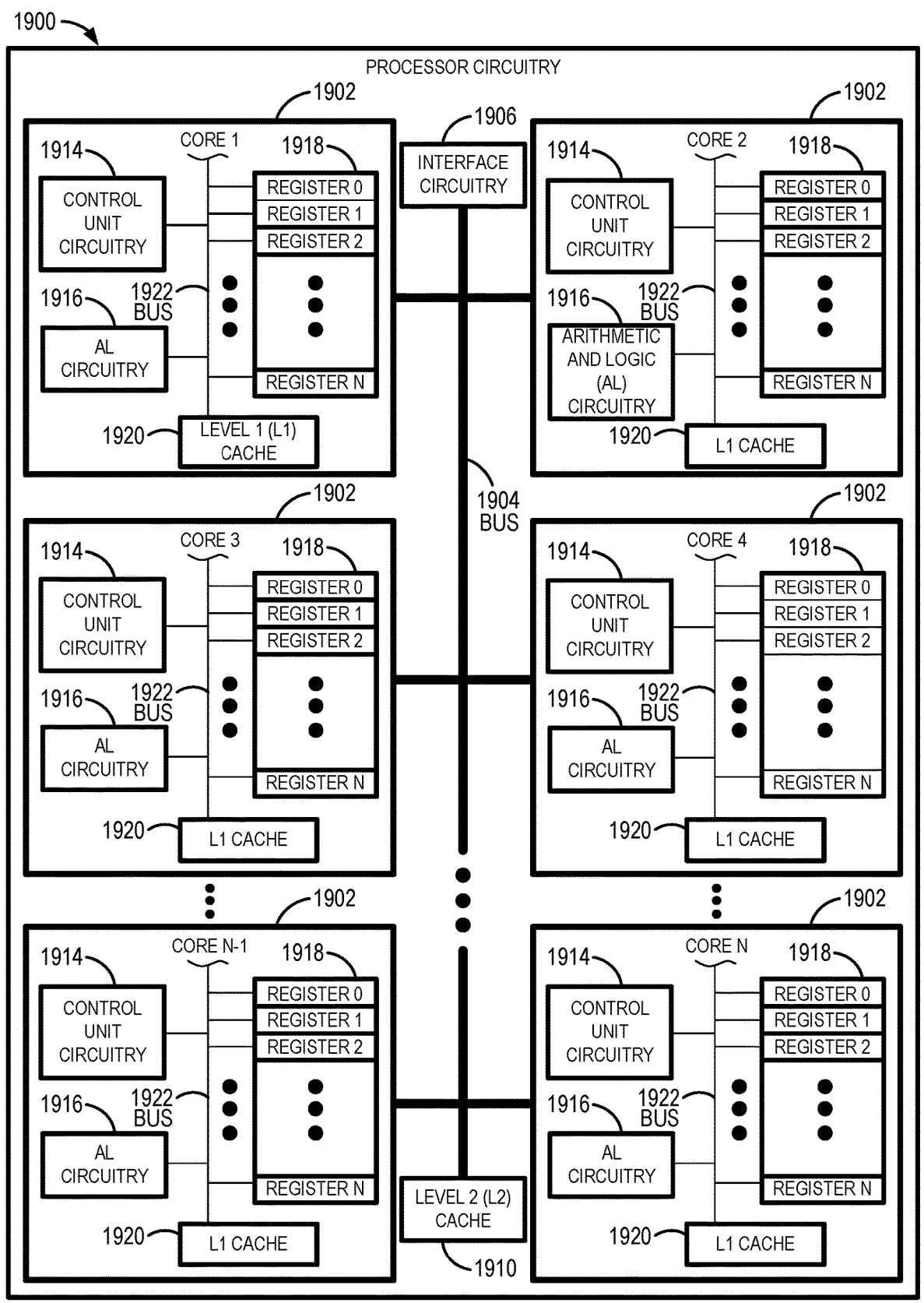
FIG. 19 is a block diagram of an example implementation of the programmable circuitry of FIG. 18.

FIG. 19 is a block diagram of an example implementation of the programmable circuitry 1812 of FIG. 18. In this example, the programmable circuitry 1812 of FIG. 18 is implemented by a microprocessor 1900. For example, the microprocessor 1900 may be a general-purpose microprocessor (e.g., general-purpose microprocessor circuitry). The microprocessor 1900 executes some or all of the machine-readable instructions of the flowchart of FIG. 4 to effectively instantiate the circuitry of FIG. 2 as logic circuits to perform operations corresponding to those machine readable instructions. In some such examples, the circuitry of FIG. 3 is instantiated by the hardware circuits of the microprocessor 1900 in combination with the machine-readable instructions. For example, the microprocessor 1900 may be implemented by multi-core hardware circuitry such as a CPU, a DSP, a GPU, an XPU, etc. Although it may include any number of example cores 1902 (e.g., 1 core), the microprocessor 1900 of this example is a multi-core semiconductor device including N cores. The cores 1902 of the microprocessor 1900 may operate independently or may cooperate to execute machine readable instructions. For example, machine code corresponding to a firmware program, an embedded software program, or a software program may be executed by one of the cores 1902 or may be executed by multiple ones of the cores 1902 at the same or different times. In some examples, the machine code corresponding to the firmware program, the embedded software program, or the software program is split into threads and executed in parallel by two or more of the cores 1902. The software program may correspond to a portion or all of the machine readable instructions and/or operations represented by the flowchart of FIG. 4.

The cores 1902 may communicate by a first example bus 1904. In some examples, the first bus 1904 may be implemented by a communication bus to effectuate communication associated with one(s) of the cores 1902. For example, the first bus 1904 may be implemented by at least one of an Inter-Integrated Circuit (I2C) bus, a Serial Peripheral Interface (SPI) bus, a PCI bus, or a PCIe bus. Additionally or alternatively, the first bus 1904 may be implemented by any other type of computing or electrical bus. The cores 1902 may obtain data, instructions, and/or signals from one or more external devices by example interface circuitry 1906. The cores 1902 may output data, instructions, and/or signals to the one or more external devices by the interface circuitry 1906. Although the cores 1902 of this example include example local memory 1920 (e.g., Level 1 (L1) cache that may be split into an L1 data cache and an L1 instruction cache), the microprocessor 1900 also includes example shared memory 1910 that may be shared by the cores (e.g., Level 2 (L2 cache)) for high-speed access to data and/or instructions. Data and/or instructions may be transferred (e.g., shared) by writing to and/or reading from the shared memory 1910. The local memory 1920 of each of the cores 1902 and the shared memory 1910 may be part of a hierarchy of storage devices including multiple levels of cache memory and the main memory (e.g., the main memory 1814, 1816 of FIG. 18). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1902 may be referred to as a CPU, DSP, GPU, etc., or any other type of hardware circuitry. Each core 1902 includes control unit circuitry 1914, arithmetic and logic (AL) circuitry (sometimes referred to as an ALU) 1916, a plurality of registers 1918, the local memory 1920, and a second example bus 1922. Other structures may be present. For example, each core 1902 may include vector unit circuitry, single instruction multiple data (SIMD) unit circuitry, load/store unit (LSU) circuitry, branch/jump unit circuitry, floating-point unit (FPU) circuitry, etc. The control unit circuitry 1914 includes semiconductor-based circuits structured to control (e.g., coordinate) data movement within the corresponding core 1902. The AL circuitry 1916 includes semiconductor-based circuits structured to perform one or more mathematic and/or logic operations on the data within the corresponding core 1902. The AL circuitry 1916 of some examples performs integer based operations. In other examples, the AL circuitry 1916 also performs floating-point operations. In yet other examples, the AL circuitry 1916 may include first AL circuitry that performs integer-based operations and second AL circuitry that performs floating-point operations. In some examples, the AL circuitry 1916 may be referred to as an Arithmetic Logic Unit (ALU).

The registers 1918 are semiconductor-based structures to store data and/or instructions such as results of one or more of the operations performed by the AL circuitry 1916 of the corresponding core 1902. For example, the registers 1918 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1918 may be arranged in a bank as shown in FIG. 19. Alternatively, the registers 1918 may be organized in any other arrangement, format, or structure, such as by being distributed throughout the core 1902 to shorten access time. The second bus 1922 may be implemented by at least one of an I2C bus, a SPI bus, a PCI bus, or a PCIe bus.

Each core 1902 and/or, more generally, the microprocessor 1900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1900 is a semiconductor device fabricated to include many transistors interconnected to implement the structures described above in one or more integrated circuits (ICs) contained in one or more packages.

The microprocessor 1900 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1900, in the same chip package as the microprocessor 1900 and/or in one or more separate packages from the microprocessor 1900.

Figure 20:
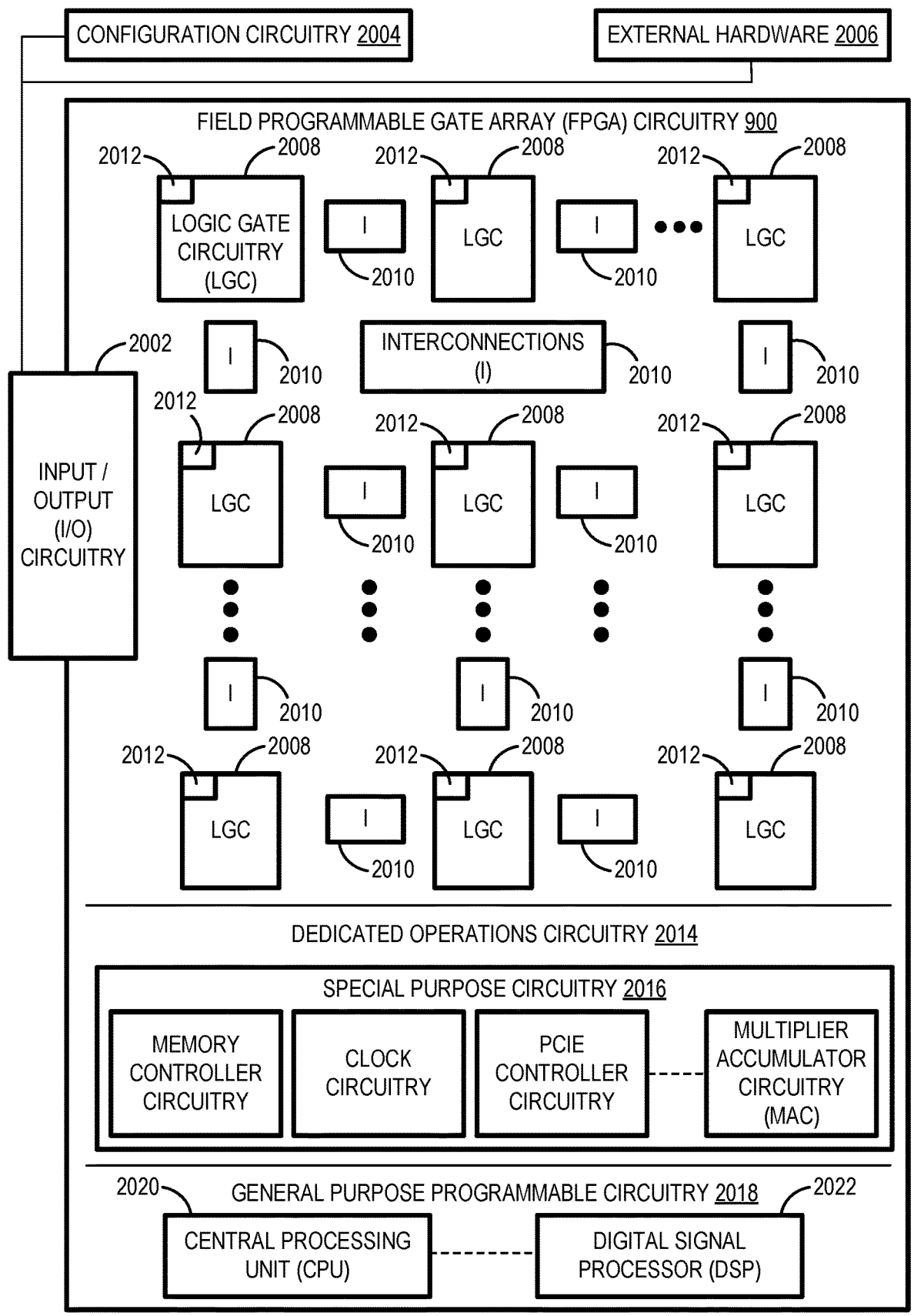
FIG. 20 is a block diagram of another example implementation of the programmable circuitry of FIG. 18.

FIG. 20 is a block diagram of another example implementation of the programmable circuitry 1812 of FIG. 18. In this example, the programmable circuitry 1812 is implemented by FPGA circuitry 2000. For example, the FPGA circuitry 2000 may be implemented by an FPGA. The FPGA circuitry 2000 can be used, for example, to perform operations that could otherwise be performed by the example microprocessor 1900 of FIG. 19 executing corresponding machine readable instructions. However, once configured, the FPGA circuitry 2000 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1900 of FIG. 19 described above (which is a general purpose device that may be programmed to execute some or all of the machine readable instructions represented by the flowchart of FIG. 4 but whose interconnections and logic circuitry are fixed once fabricated), the FPGA circuitry 2000 of the example of FIG. 20 includes interconnections and logic circuitry that may be configured, structured, programmed, and/or interconnected in different ways after fabrication to instantiate, for example, some or all of the operations/functions corresponding to the machine readable instructions represented by the flowchart of FIG. 4. In particular, the FPGA circuitry 2000 may be thought of as an array of logic gates, interconnections, and switches. The switches can be programmed to change how the logic gates are interconnected by the interconnections, effectively forming one or more dedicated logic circuits (unless and until the FPGA circuitry 2000 is reprogrammed). The configured logic circuits enable the logic gates to cooperate in different ways to perform different operations on data received by input circuitry. Those operations may correspond to some or all of the instructions (e.g., the software and/or firmware) represented by the flowchart of FIG. 4. As such, the FPGA circuitry 2000 may be configured and/or structured to effectively instantiate some or all of the operations/functions corresponding to the machine readable instructions of the flowchart of FIG. 4 as dedicated logic circuits to perform the operations/functions corresponding to those software instructions in a dedicated manner analogous to an ASIC. Therefore, the FPGA circuitry 2000 may perform the operations/functions corresponding to the some or all of the machine readable instructions of FIG. 4 faster than the general-purpose microprocessor can execute the same.

In the example of FIG. 20, the FPGA circuitry 2000 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 2000 of FIG. 20 may access and/or load the binary file to cause the FPGA circuitry 2000 of FIG. 20 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 2000 of FIG. 20 to cause configuration and/or structuring of the FPGA circuitry 2000 of FIG. 20, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 2000 of FIG. 20 may access and/or load the binary file to cause the FPGA circuitry 2000 of FIG. 20 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 2000 of FIG. 20 to cause configuration and/or structuring of the FPGA circuitry 2000 of FIG. 20, or portion(s) thereof.

The FPGA circuitry 2000 of FIG. 20, includes example input/output (I/O) circuitry 2002 to obtain and/or output data to/from example configuration circuitry 2004 and/or external hardware 2006. For example, the configuration circuitry 2004 may be implemented by interface circuitry that may obtain a binary file, which may be implemented by a bit stream, data, and/or machine-readable instructions, to configure the FPGA circuitry 2000, or portion(s) thereof. In some such examples, the configuration circuitry 2004 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 2006 may be implemented by external hardware circuitry. For example, the external hardware 2006 may be implemented by the microprocessor 1900 of FIG. 19.

The FPGA circuitry 2000 also includes an array of example logic gate circuitry 2008, a plurality of example configurable interconnections 2010, and example storage circuitry 2012. The logic gate circuitry 2008 and the configurable interconnections 2010 are configurable to instantiate one or more operations/functions that may correspond to at least some of the machine readable instructions of FIG. 4 and/or other desired operations. The logic gate circuitry 2008 shown in FIG. 20 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2008 to enable configuration of the electrical structures and/or the logic gates to form circuits to perform desired operations/functions. The logic gate circuitry 2008 may include other electrical structures such as look-up tables (LUTs), registers (e.g., flip-flops or latches), multiplexers, etc.

The configurable interconnections 2010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2008 to program desired logic circuits.

The storage circuitry 2012 of the illustrated example is structured to store result(s) of the one or more of the operations performed by corresponding logic gates. The storage circuitry 2012 may be implemented by registers or the like. In the illustrated example, the storage circuitry 2012 is distributed amongst the logic gate circuitry 2008 to facilitate access and increase execution speed.

The example FPGA circuitry 2000 of FIG. 20 also includes example dedicated operations circuitry 2014. In this example, the dedicated operations circuitry 2014 includes special purpose circuitry 2016 that may be invoked to implement commonly used functions to avoid the need to program those functions in the field. Examples of such special purpose circuitry 2016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2000 may also include example general purpose programmable circuitry 2018 such as an example CPU 2020 and/or an example DSP 2022. Other general purpose programmable circuitry 2018 may additionally or alternatively be present such as a GPU, an XPU, etc., that can be programmed to perform other operations.

Although FIGS. 19 and 20 illustrate two example implementations of the programmable circuitry 1812 of FIG. 18, many other approaches are contemplated. For example, FPGA circuitry may include an on-board CPU, such as one or more of the example CPU 2020 of FIG. 19. Therefore, the programmable circuitry 1812 of FIG. 18 may additionally be implemented by combining at least the example microprocessor 1900 of FIG. 19 and the example FPGA circuitry 2000 of FIG. 20. In some such hybrid examples, one or more cores 1902 of FIG. 19 may execute a first portion of the machine readable instructions represented by the flowchart of FIG. 4 to perform first operation(s)/function(s), the FPGA circuitry 2000 of FIG. 20 may be configured and/or structured to perform second operation(s)/function(s) corresponding to a second portion of the machine readable instructions represented by the flowchart of FIG. 4, and/or an ASIC may be configured and/or structured to perform third operation(s)/function(s) corresponding to a third portion of the machine readable instructions represented by the flowchart of FIG. 4.

It should be understood that some or all of the circuitry of FIG. 3 may, thus, be instantiated at the same or different times. For example, same and/or different portion(s) of the microprocessor 1900 of FIG. 19 may be programmed to execute portion(s) of machine-readable instructions at the same and/or different times. In some examples, same and/or different portion(s) of the FPGA circuitry 2000 of FIG. 20 may be configured and/or structured to perform operations/functions corresponding to portion(s) of machine-readable instructions at the same and/or different times.

In some examples, some or all of the circuitry of FIG. 3 may be instantiated, for example, in one or more threads executing concurrently and/or in series. For example, the microprocessor 1900 of FIG. 19 may execute machine readable instructions in one or more threads executing concurrently and/or in series. In some examples, the FPGA circuitry 2000 of FIG. 20 may be configured and/or structured to carry out operations/functions concurrently and/or in series. Moreover, in some examples, some or all of the circuitry of FIG. 3 may be implemented within one or more virtual machines and/or containers executing on the microprocessor 1900 of FIG. 19.

In some examples, the programmable circuitry 1812 of FIG. 18 may be in one or more packages. For example, the microprocessor 1900 of FIG. 19 and/or the FPGA circuitry 2000 of FIG. 20 may be in one or more packages. In some examples, an XPU may be implemented by the programmable circuitry 1812 of FIG. 18, which may be in one or more packages. For example, the XPU may include a CPU (e.g., the microprocessor 1900 of FIG. 19, the CPU 2020 of FIG. 20, etc.) in one package, a DSP (e.g., the DSP 2022 of FIG. 20) in another package, a GPU in yet another package, and an FPGA (e.g., the FPGA circuitry 2000 of FIG. 20) in still yet another package.

Figure 21:
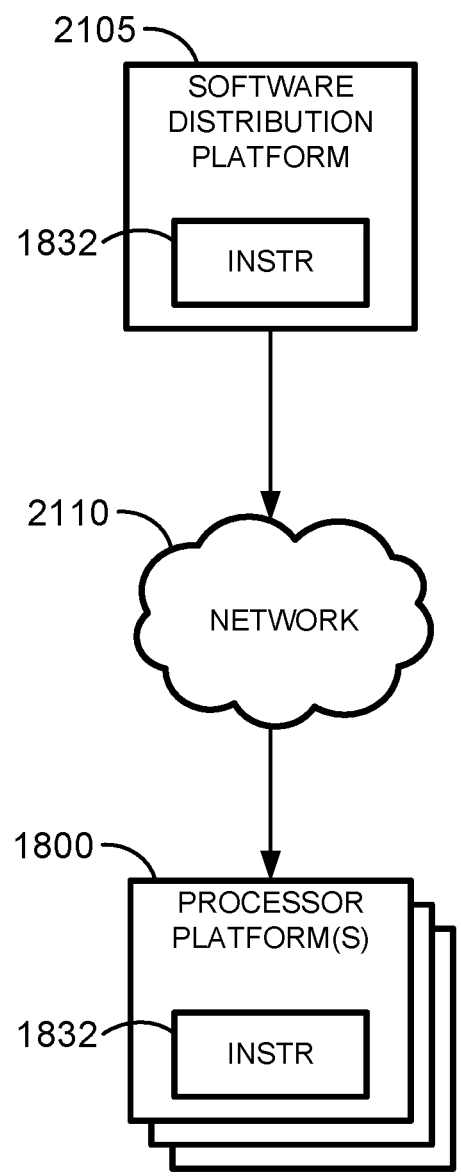
FIG. 21 is a block diagram of an example software/firmware/instructions distribution platform (e.g., one or more servers) to distribute software, instructions, and/or firmware (e.g., corresponding to the example machine readable instructions of FIG. 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2105 to distribute software such as the example machine readable instructions 1832 of FIG. 18 to other hardware devices (e.g., hardware devices owned and/or operated by third parties from the owner and/or operator of the software distribution platform) is illustrated in FIG. 21. The example software distribution platform 2105 may be implemented by any computer server, data facility, cloud service, etc., capable of storing and transmitting software to other computing devices. The third parties may be customers of the entity owning and/or operating the software distribution platform 2105. For example, the entity that owns and/or operates the software distribution platform 2105 may be a developer, a seller, and/or a licensor of software such as the example machine readable instructions 1832 of FIG. 18. The third parties may be consumers, users, retailers, OEMs, etc., who purchase and/or license the software for use and/or re-sale and/or sub-licensing. In the illustrated example, the software distribution platform 2105 includes one or more servers and one or more storage devices. The storage devices store the machine readable instructions 1832, which may correspond to the example machine readable instructions of FIG. 4, as described above. The one or more servers of the example software distribution platform 2105 are in communication with an example network 2110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1832 from the software distribution platform 2105. For example, the software, which may correspond to the example machine readable instructions of FIG. 4, may be downloaded to the example programmable circuitry platform 1800, which is to execute the machine readable instructions 1832 to implement the vehicle guidance system 300. In some examples, one or more servers of the software distribution platform 2105 periodically offer, transmit, and/or force updates to the software (e.g., the example machine readable instructions 1832 of FIG. 18) to ensure improvements, patches, updates, etc., are distributed and applied to the software at the end user devices. Although referred to as software above, the distributed "software" could alternatively be firmware.

Example methods, apparatus, systems, and articles of manufacture to enable accurate control/alignment of vehicles are disclosed herein. Further examples and combinations thereof include the following:

Example 1 includes an apparatus for guidance of an aircraft with respect to a target, the apparatus comprising machine readable instructions, and programmable circuitry to at least one of instantiate or execute the machine readable instructions to determine a movement constraint based on a line-of-sight (LoS) corresponding to an orientation of the aircraft with respect to the target, and adjust, based on the movement constraint, movement of the aircraft to relax flight path following to maintain or cause the LoS to be directed away from an occlusion region.

Example 2 includes the apparatus as defined in example 1, wherein the adjustment of the movement includes generation of a commanded flight path.

Example 3 includes the apparatus as defined in example 2, wherein the generation of the commanded flight path includes adjusting a previous flight path, and wherein the commanded flight path has a longer path length than the previous flight path.

Example 4 includes the apparatus as defined in any of examples 1 to 3, wherein the movement constraint corresponds to a bank of the aircraft, and wherein the programmable circuitry is to limit the bank of the aircraft.

Example 5 includes the apparatus as defined in example 4, wherein the programmable circuitry is to vary a degree of an adjustment of the bank angle of the aircraft based on a proximity of the LoS to the occlusion region.

Example 6 includes the apparatus as defined in any of examples 1 to 5, wherein alignment criterion of the LOS corresponds to alignment of a functional vector of the aircraft toward the target.

Example 7 includes the apparatus as defined in any of examples 1 to 5, wherein alignment criterion of the LOS corresponds to alignment of a functional vector of the aircraft away from the target.

Example 8 includes the apparatus as defined in any of examples 1 to 7, wherein the adjusted movement of the aircraft defines bank-to-turn logic of the aircraft.

Example 9 includes a non-transitory machine readable storage medium comprising instructions to cause programmable circuitry to at least determine an orientation of an aircraft, determine a line-of-sight (LoS) corresponding to the orientation with respect to a target, determine a movement constraint of the aircraft based on an LoS criterion, and adjust, based on the movement constraint, movement of the aircraft to relax flight path following to maintain or cause the LoS to be directed away from an occlusion.

Example 10 includes the non-transitory machine readable storage medium as defined in example 9, wherein the adjustment of the movement includes generation of a commanded flight path to maintain the LoS away from the occlusion.

Example 11 includes the non-transitory machine readable storage medium as defined in example 10, wherein the generation of the commanded flight path includes adjusting a previous flight path, and wherein the commanded flight path has a longer path length than the previous flight path.

Example 12 includes the non-transitory machine readable storage medium as defined in any of examples 9 to 11, wherein the movement constraint is related to a bank of the aircraft, and wherein the instructions cause the programmable circuitry to limit the bank of the aircraft.

Example 13 includes the non-transitory machine readable storage medium as defined in example 12, wherein the instructions cause the programmable circuitry to limit the bank of the aircraft based on a heading of the aircraft.

Example 14 includes the non-transitory machine readable storage medium as defined in any of examples 9 to 13, wherein the adjusted movement of the aircraft corresponds to aligning a functional vector of the aircraft away from a cone of the occlusion to a requisite degree.

Example 15 includes the non-transitory machine readable storage medium as defined in example 14, wherein a rate to which the movement of the aircraft is adjusted is based on a degree of alignment between the functional vector and the cone of the occlusion.

Example 16 includes the non-transitory machine readable storage medium as defined in any of examples 9 to 15, wherein the adjustment of the movement includes bank-to-turn logic of the aircraft.

Example 17 includes a method comprising determining, by executing instructions with programmable circuitry, an orientation of an aircraft, determining, by executing instructions with the programmable circuitry, a movement constraint of the aircraft based on a line-of-sight (LoS) criterion of an LoS corresponding to the orientation of the aircraft with respect to a target, and adjusting, by executing instructions with the programmable circuitry, a movement of the aircraft based on the movement constraint to maintain or cause the LoS to be directed away from an occlusion region.

Example 18 includes the method as defined in example 17, further including generating a commanded flight path, the commanded flight path including bank-to-turn logic.

Example 19 includes the method as defined in example 18, wherein the generation of the commanded flight path includes adjusting, by executing instructions with the programmable circuitry, a previous flight path, and wherein the commanded flight path has a longer path length than the previous flight path.

Example 20 includes the method as defined in any of examples 17 to 19, wherein the movement constraint is related to a bank of the aircraft, and further including limiting the bank of the aircraft.

From the foregoing, it will be appreciated that example systems, apparatus, articles of manufacture, and methods have been disclosed that enable effective enforcement of LoS requirements for vehicles. Examples disclosed herein can enable more successful missions of unmanned aircraft, for example. Examples disclosed can reduce overall mission time by enabling successful data acquisition, etc. Examples disclosed herein can also enable controlled viewing and/or exposure of vehicles (e.g., radar evasion, etc.)

Disclosed systems, apparatus, articles of manufacture, and methods improve the efficiency of using a computing device by efficiently guiding aircraft with respect to LoS requirements such that course corrections and/or other corrections are not necessitated. Disclosed systems, apparatus, articles of manufacture, and methods are accordingly directed to one or more improvement(s) in the operation of a machine such as a computer or other electronic and/or mechanical device.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent. While examples disclosed herein are shown in the context of fixed wing aircraft, examples disclosed herein can be utilized in conjunction with any other appropriate application with alignment control or any other appropriate type of vehicle and/or satellite, etc.

What is claimed is:

1. An apparatus for guidance of an aircraft with respect to a target, the apparatus comprising:
   machine readable instructions; and
   programmable circuitry to be programmed by the machine readable instructions to:
      determine a movement constraint based on a line-of-sight (LoS) criterion of an LoS corresponding to an orientation of the aircraft with respect to the target, wherein the movement constraint corresponds to a bank of the aircraft, and
      limit, based on the movement constraint, the bank of the aircraft to relax flight path following to maintain or cause the LoS to be directed away from an occlusion region, the flight path following relaxed from a first flight path having a first path length to a second flight path having a second path length longer than the first path length.

2. The apparatus as defined in claim 1, wherein the limiting of the bank angle includes generation of a commanded flight path.

3. The apparatus as defined in claim 1, wherein the programmable circuitry is to vary a degree of the limiting of the bank angle of the aircraft based on a proximity of the LoS to the occlusion region.

4. The apparatus as defined in claim 1, wherein alignment criterion of the LOS corresponds to alignment of a functional vector of the aircraft toward the target.

5. The apparatus as defined in claim 1, wherein alignment criterion of the LOS corresponds to alignment of a functional vector of the aircraft away from the target.

6. The apparatus as defined in claim 1, wherein the limiting of the bank angle of the aircraft includes defining bank-to-turn logic of the aircraft.

7. The apparatus as defined in claim 1, wherein the occlusion region is defined by a portion of the aircraft.

8. The apparatus as defined in claim 7, wherein the portion includes a wing of the aircraft.

9. The apparatus as defined in claim 1, wherein the programmable circuitry is to change a shape of the first flight path to define the second flight path.

10. The apparatus as defined in claim 9, wherein the programmable circuitry is to add or remove at least one of a segment or a spline of the first flight path to the second flight path for defining the second flight path.

11. The apparatus as defined in claim 1, wherein the programmable circuitry is to define a bank angle sequence corresponding to the second flight path.

12. The apparatus as defined in claim 1, wherein the programmable circuitry is to define bank-to-turn logic based on the second flight path.

13. The apparatus as defined in claim 1, wherein the second flight path corresponds to guidance logic that defines a control loop.

14. A non-transitory machine readable storage medium comprising instructions to cause at least one programmable circuitry to at least:
determine an orientation of an aircraft;
determine a line-of-sight (LoS) corresponding to the orientation with respect to a target;
determine a movement constraint of the aircraft based on an LOS criterion, wherein the movement constraint corresponds to a bank of the aircraft; and
limit, based on the movement constraint, the bank angle of the aircraft to relax flight path following to maintain or cause the LoS to be directed away from an occlusion, the flight path following relaxed from a first flight path having a first path length to a second flight path having a second path length longer than the first path length.

15. The non-transitory machine readable storage medium as defined in claim 14, wherein the limiting of the bank angle includes generation of a commanded flight path to maintain the LoS to be directed away from the occlusion.

16. The non-transitory machine readable storage medium as defined in claim 14, wherein the limiting of the bank angle of the aircraft corresponds to aligning a functional vector of the aircraft away from a cone of the occlusion to a requisite degree.

17. The non-transitory machine readable storage medium as defined in claim 16, wherein a a movement of the aircraft adjusted is based on a degree of alignment between the functional vector and the cone of the occlusion.

18. The non-transitory machine readable storage medium as defined in claim 14, wherein the limiting of the bank angle includes bank-to-turn logic of the aircraft.

19. A method comprising:
determining, by executing instructions with at least one programmable circuitry, an orientation of an aircraft;
determining, by executing instructions with one or more of the at least one programmable circuitry, a movement constraint of the aircraft based on a line-of-sight (LoS) criterion of an LoS corresponding to the orientation of the aircraft with respect to a target, wherein the movement constraint corresponds to a bank of the aircraft; and
limiting, by executing instructions with one or more of the at least one programmable circuitry, the bank of the aircraft based on the movement constraint to maintain or cause the LoS to be directed away from an occlusion region, the flight path following relaxed from a first flight path having a first path length to a second flight path having a second path length longer than the first path length.

20. The method as defined in claim 19, further including generating, by executing instructions with one or more of the at least one programmable circuitry, a commanded flight path, the commanded flight path including bank-to-turn logic.

* * * * *